United States Patent
Saowapa

(10) Patent No.: US 9,235,915 B2
(45) Date of Patent: Jan. 12, 2016

(54) IMAGE DATA GENERATION METHOD, IMAGE DATA GENERATION DEVICE, AND IMAGE DATA GENERATION PROGRAM

(71) Applicant: Kiattichai Saowapa, Kanagawa (JP)

(72) Inventor: Kiattichai Saowapa, Kanagawa (JP)

(73) Assignee: NEC PLATFORMS, LTD, Kawasaki (JP)

( * ) Notice: Subject to any disclaimer, the term of this patent is extended or adjusted under 35 U.S.C. 154(b) by 0 days.

(21) Appl. No.: 14/386,075

(22) PCT Filed: Mar. 27, 2013

(86) PCT No.: PCT/JP2013/058921
§ 371 (c)(1),
(2) Date: Sep. 18, 2014

(87) PCT Pub. No.: WO2013/146845
PCT Pub. Date: Oct. 3, 2013

(65) Prior Publication Data
US 2015/0049092 A1 Feb. 19, 2015

(30) Foreign Application Priority Data
Mar. 28, 2012 (JP) .................. 2012-074481

(51) Int. Cl.
*G09G 5/00* (2006.01)
*G06F 17/00* (2006.01)
(Continued)

(52) U.S. Cl.
CPC .............. *G06T 11/60* (2013.01); *G06F 17/214* (2013.01); *G06F 17/2223* (2013.01); *G06T 1/60* (2013.01)

(58) Field of Classification Search
USPC ......................................................... 715/245
See application file for complete search history.

(56) References Cited

U.S. PATENT DOCUMENTS 5,416,898 A * 5/1995 Opstad et al. ................. 345/468
7,271,806 B2 * 9/2007 Everett .......................... 345/471
(Continued)

FOREIGN PATENT DOCUMENTS

JP 5-54069 A 3/1993
JP 7-234867 A 9/1995
(Continued)

OTHER PUBLICATIONS

International Search Report for PCT Application No. PCT/JP2013/058921, mailed on May 28, 2013.

*Primary Examiner* — Ryan R Yang

(57) ABSTRACT

An image data generating device generates image data that have a configuration including two or more text lines, one or more columns contained in each text line, and two or more rows contained in each column, and that are formed of a plurality of image data constituent elements. The image data generating device includes: a first data buffer that retains a first plurality of image data constituent elements contained in an upper text line of two vertically adjacent text lines out of the two or more text lines; a second data buffer that retains a second plurality of image data constituent elements contained in a lower text line of the two vertically adjacent text lines out of the two or more text lines; and a data analysis section that determines whether or not one image data constituent element out of the first plurality of image data constituent elements is present in a lower row of each column contained in the upper text line and whether or not one image data constituent element out of the second plurality of image data constituent elements is present in an upper row of each column contained in the lower text line. The data analysis section decides whether to decrease a spacing between the two vertically adjacent text lines on the basis of the determination result, and determines a decreased width in a case where the spacing is decreased.

18 Claims, 25 Drawing Sheets

(51) Int. Cl.
*G06T 11/60* (2006.01)
*G06F 17/21* (2006.01)
*G06F 17/22* (2006.01)
*G06T 1/60* (2006.01)

(56) References Cited

U.S. PATENT DOCUMENTS 7,584,424 B2 * 9/2009 Hanechak .................... 715/244

2004/0123243 A1 * 6/2004 Everett ......................... 715/517

FOREIGN PATENT DOCUMENTS

| JP | 2005-14557 A | 1/2005 |
| JP | 2005-212375 A | 8/2005 |
| JP | 2010-15462 A | 1/2010 |
| JP | 2011-175371 A | 9/2011 |

* cited by examiner

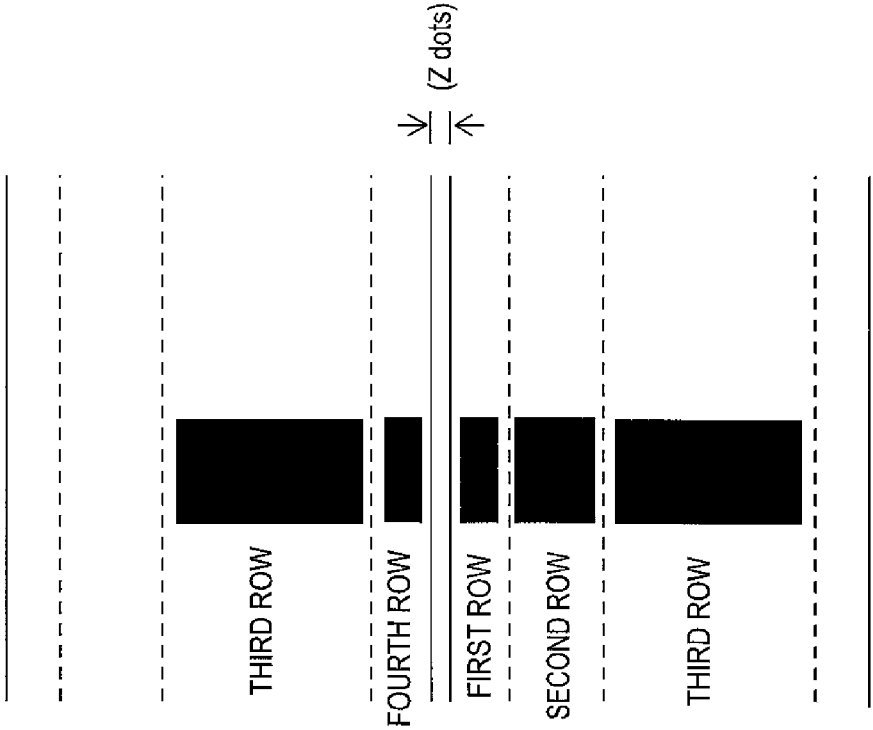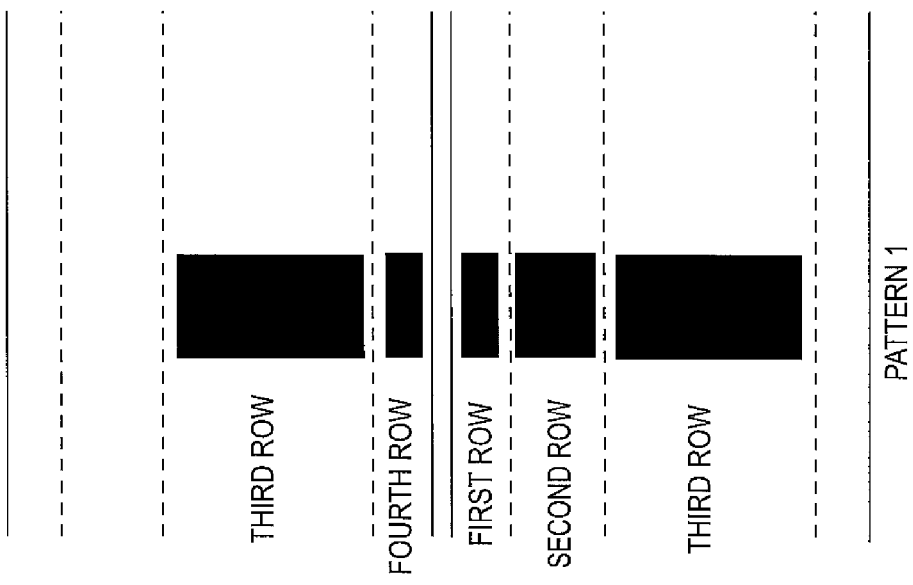

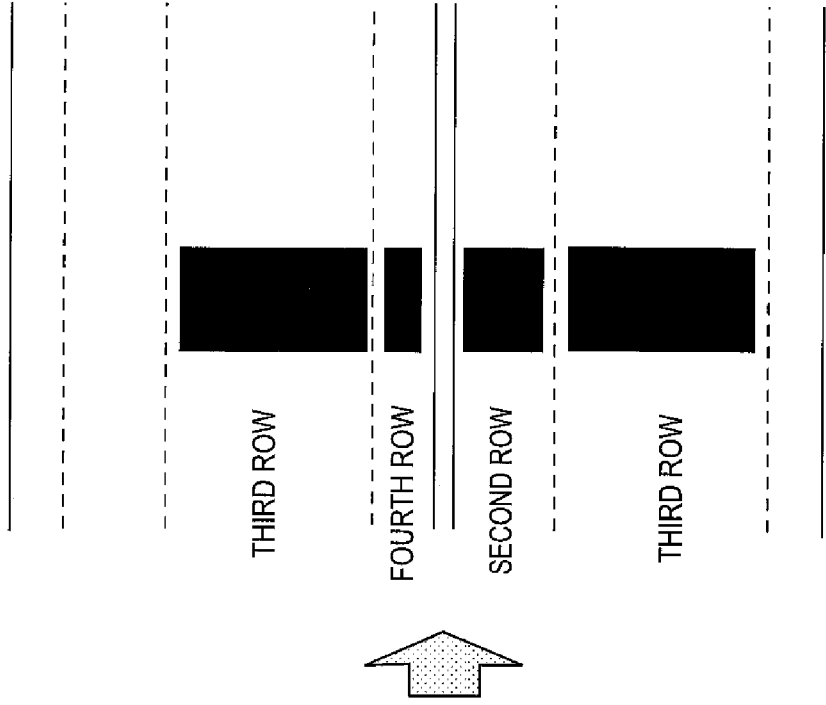
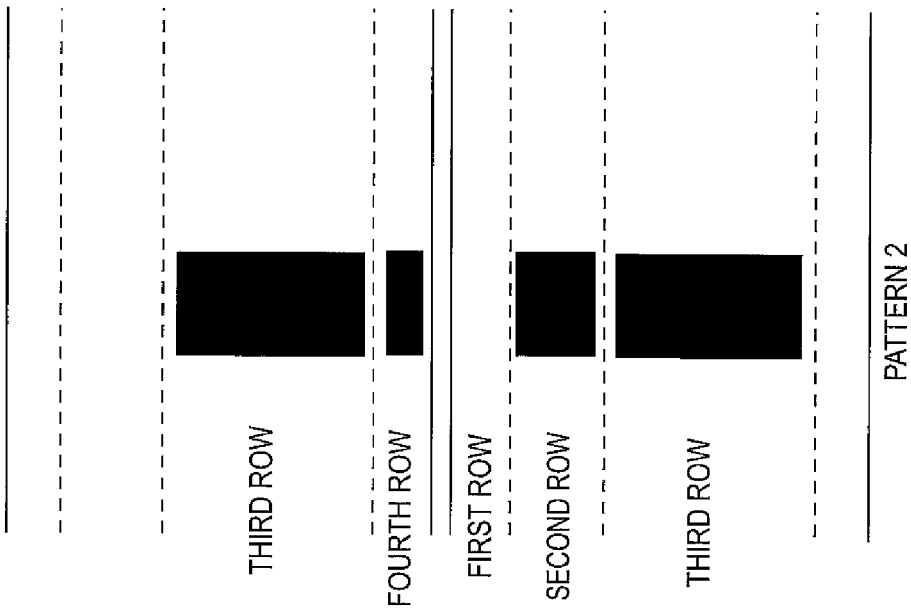

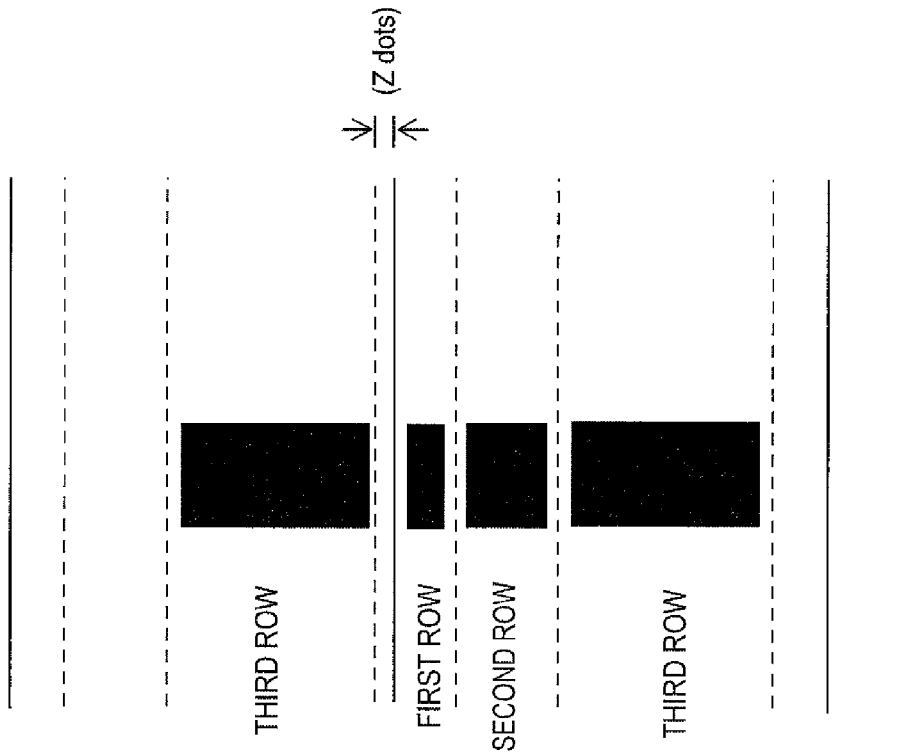
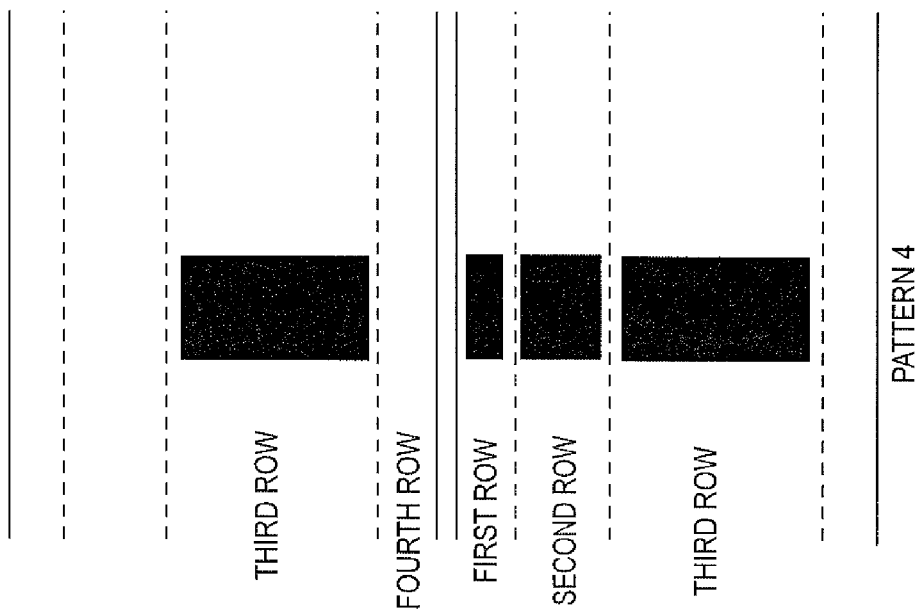

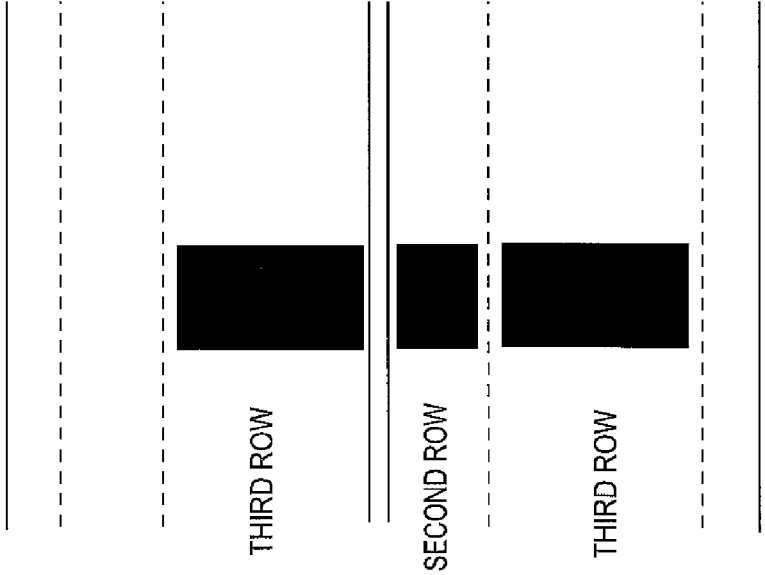
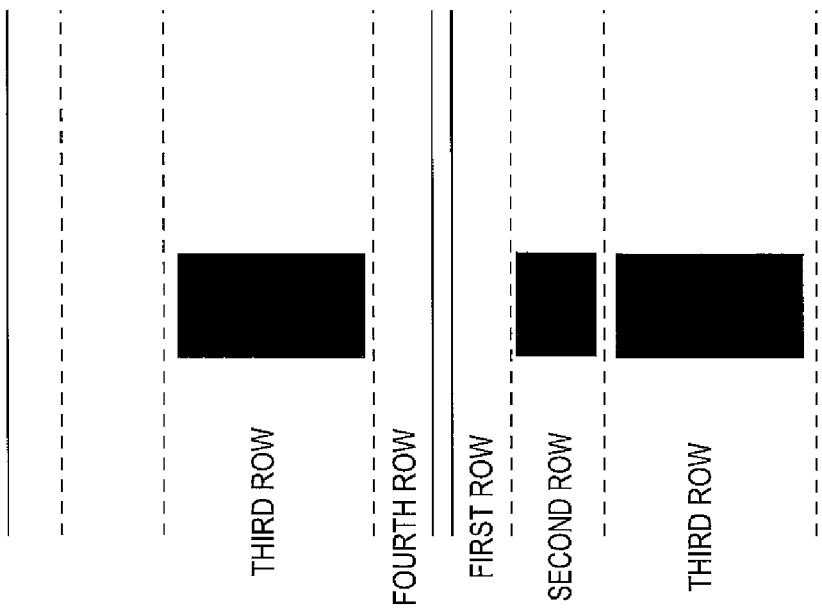

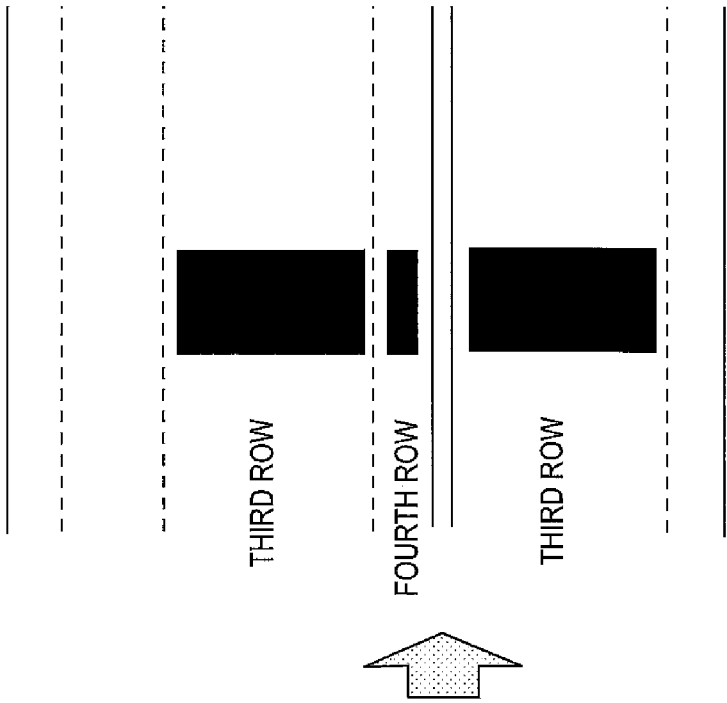
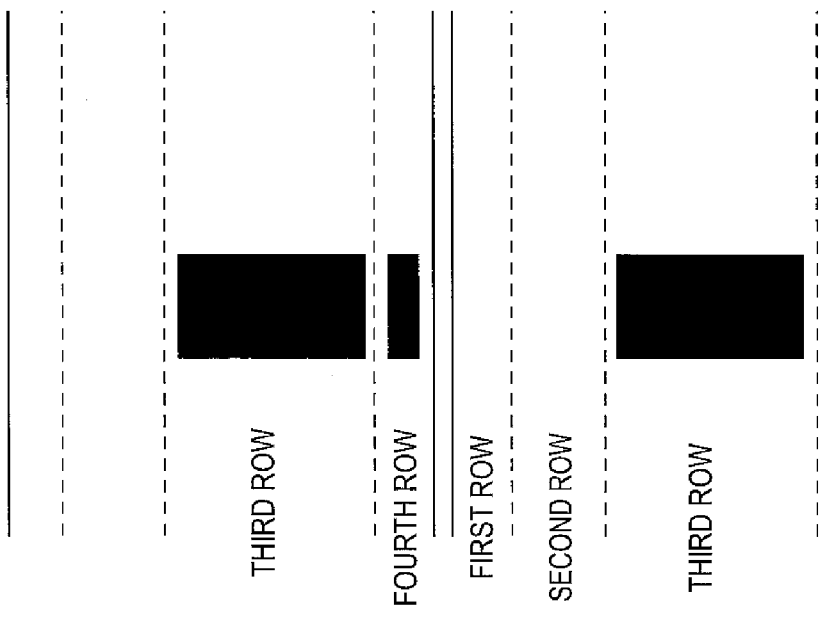

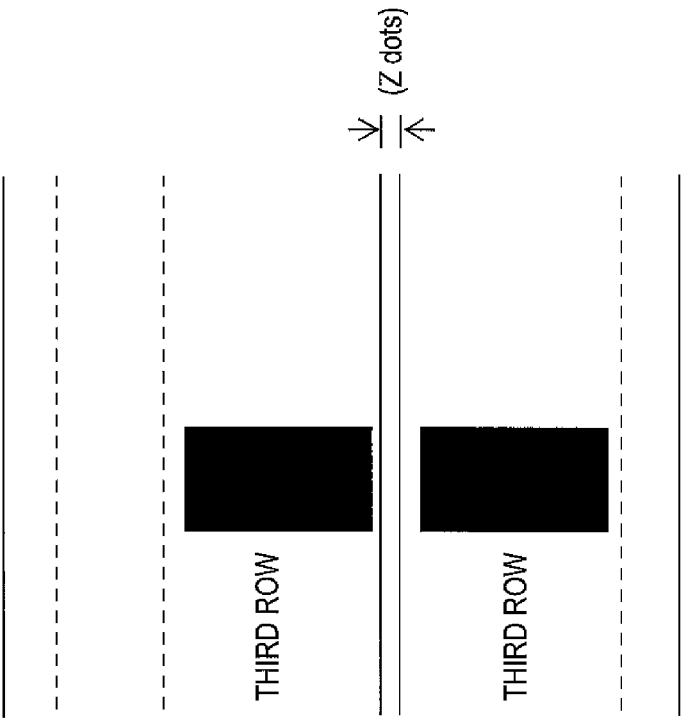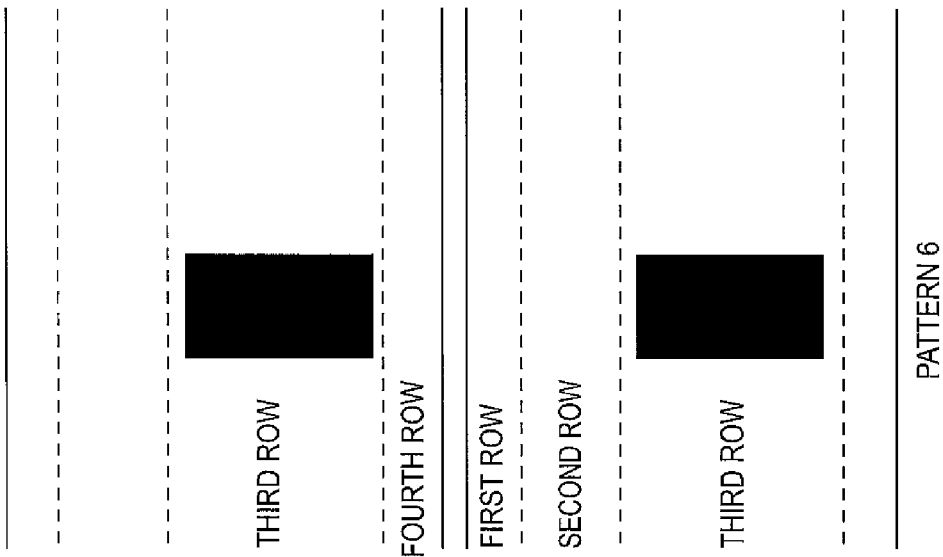

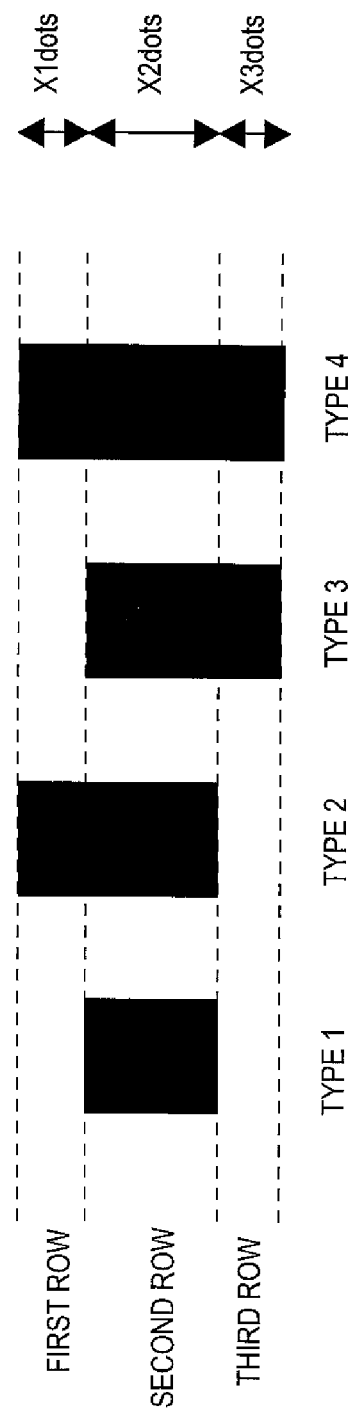

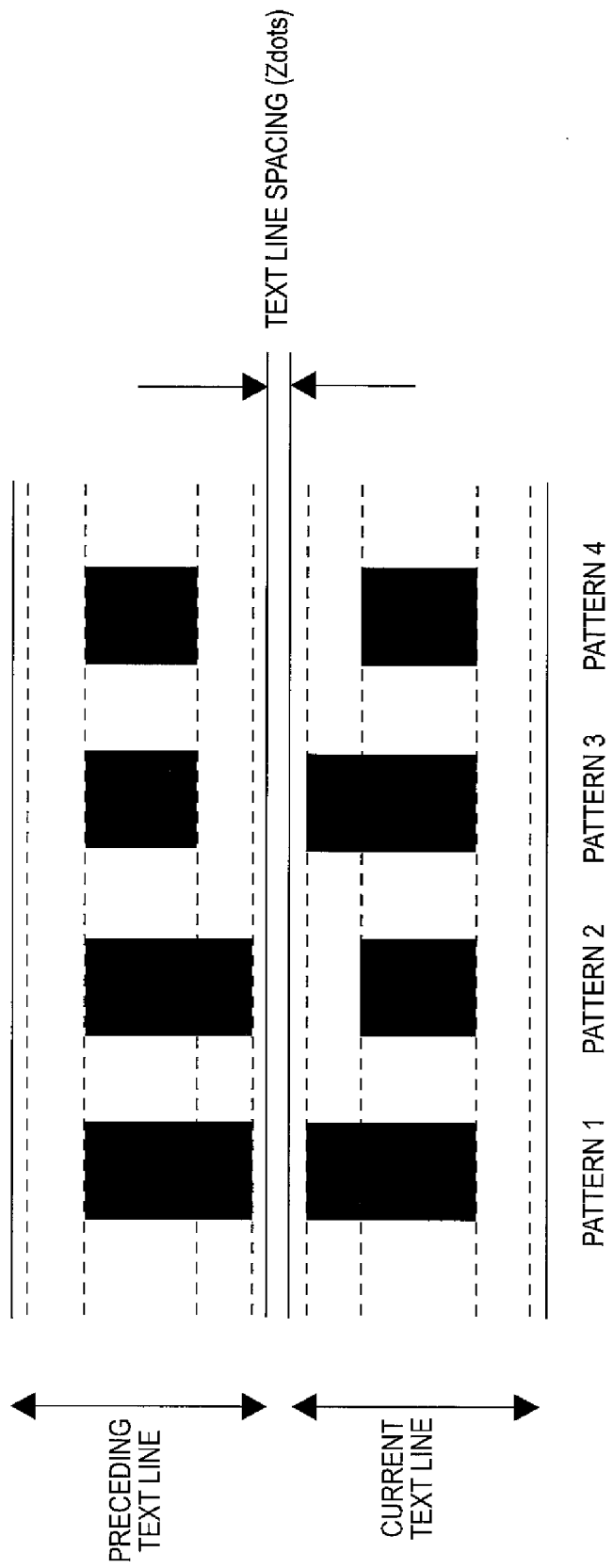

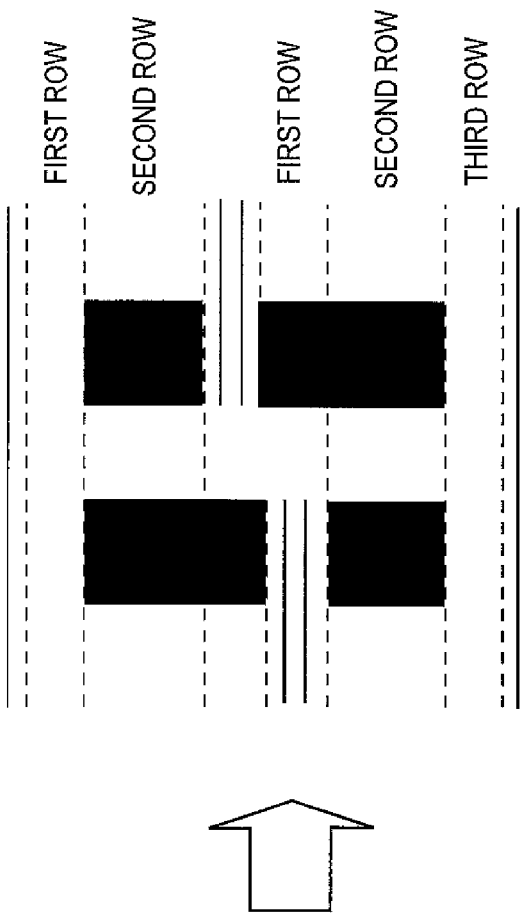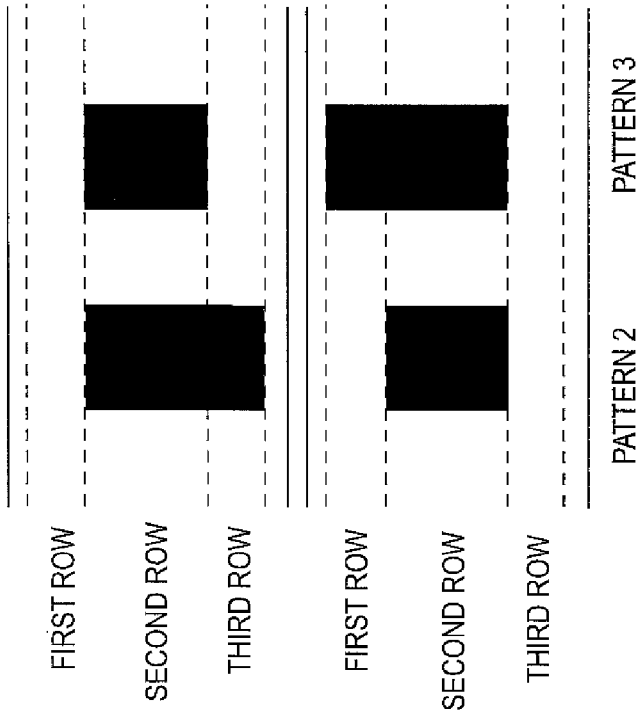
FIG.21A
FIG.21B

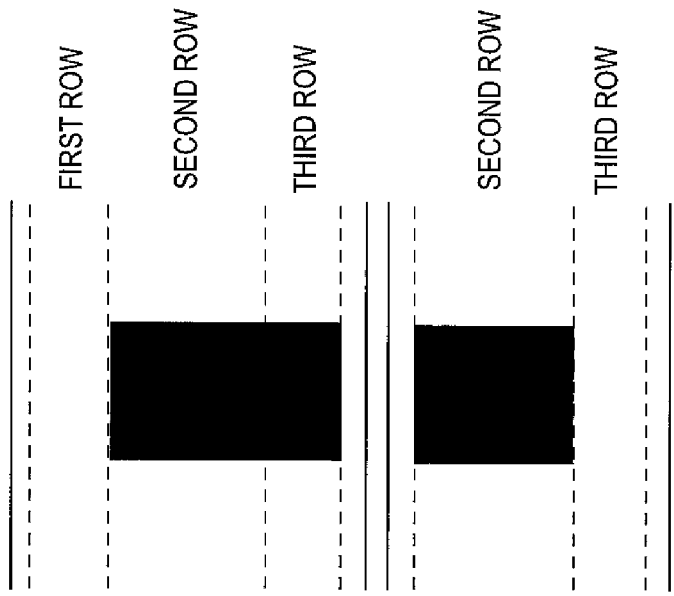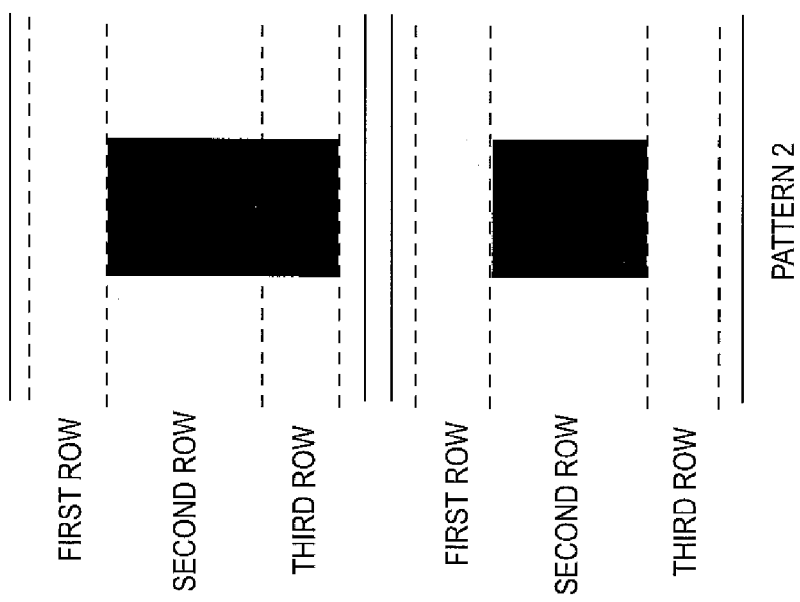

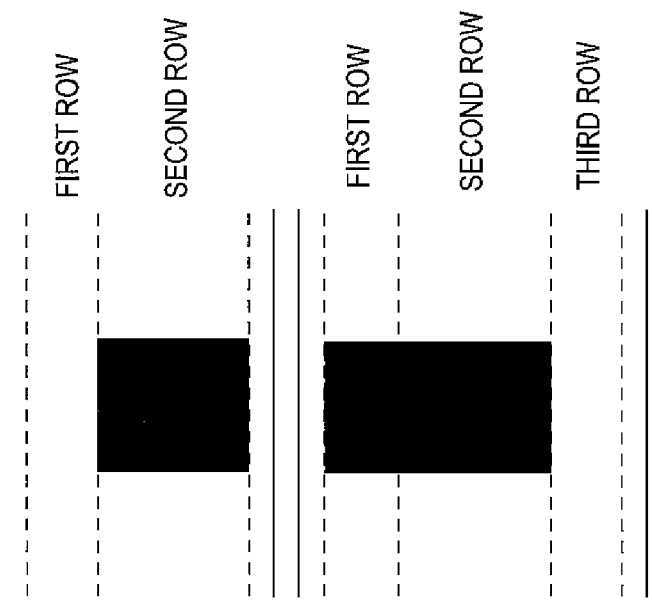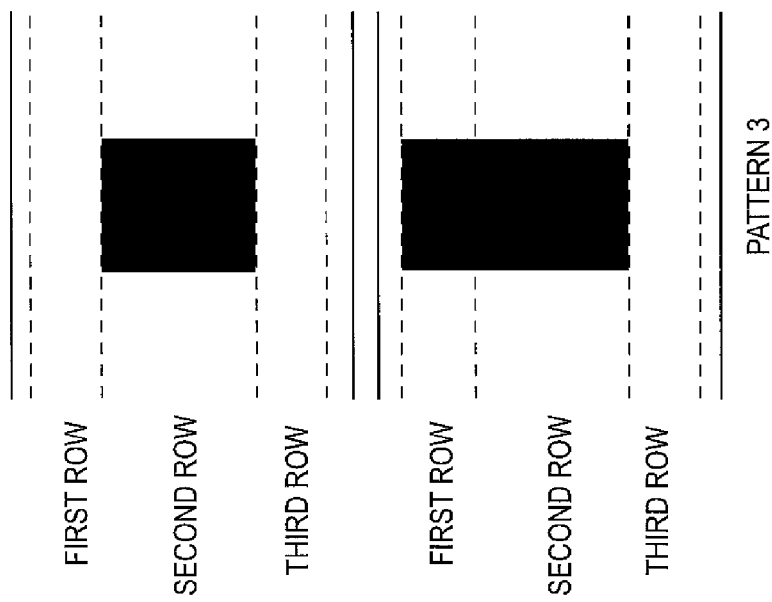

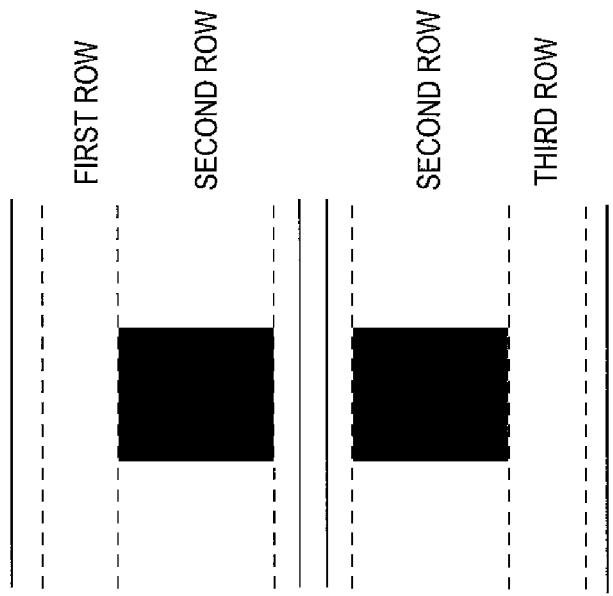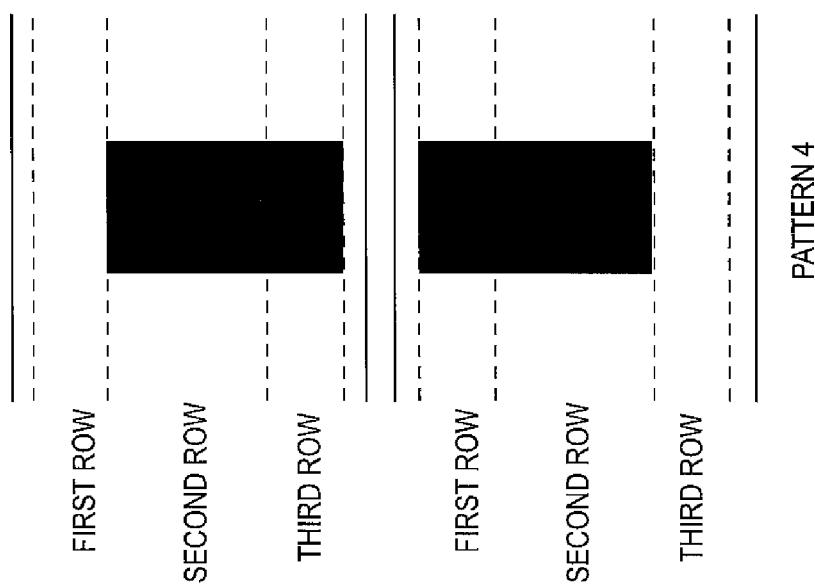

IMAGE DATA GENERATION METHOD, IMAGE DATA GENERATION DEVICE, AND IMAGE DATA GENERATION PROGRAM

This application is a National Stage Entry of PCT/JP2013/058921 filed on Mar. 27, 2013, which claims priority from Japanese Patent Application 2012-074481 filed on Mar. 28, 2012, the contents of all of which are incorporated herein by reference, in their entirety.

TECHNICAL FIELD

The present invention relates to an image data generating method, an image data generating device, and an image data generating program for printing characters or letters each formed of a plurality of rows.

BACKGROUND ART

Characteristics of printed Thai characters (also called the Siamese characters) that notate the Thai language will be described with reference to FIG. 1. FIG. 1 illustrates a specific example of printed Thai characters, and printed single-columns 101 to 106 that will be explained below are described in FIG. 1.
(a) The printed single-column 101 is a printed single-column that includes two characters printed in the third and fourth rows.
(b) The printed single-column 102 is a printed single-column that includes two characters printed in the second and third rows.
(c) The printed single-column 103 is a printed single-column that includes three characters printed in the second, third and fourth rows.
(d) The printed single-column 104 is a printed single-column that includes three characters printed in the first, second and third rows.
(e) The printed single-column 105 is a printed single-column that includes a single character printed so as to bridge the third and fourth rows.
(d) The printed single-column 106 is a printed single-column that includes a single character printed so as to bridge the second and third rows.

Printed Thai characters, including the above specific examples, possess the three characteristics listed below.

1) Each printed single-column included in a text line is formed of four rows. In the following explanation, these "rows" will be called "printed rows" as appropriate.

2) Each Thai character is basically printed in one of the printed rows, but some exceptional characters are printed in a plurality of printed rows, so as to bridge the third and second rows or the third and fourth rows.

3) A printed single-column includes at most three Thai characters. In addition, the third row always contains any given character. In other words, a printed single-column absolutely includes a character printed only in the third row or partially printed in the third row.

Because of the above three characteristics, when the Thai language is printed, an actual spacing may not be created evenly between the current text line and the text line preceding the current text line by characters printed in the two text lines. Here, the actual spacing refers to a space on a print medium (paper, display device, etc.).

The above uneven space will be explained with reference to a specific example in FIG. 2. As illustrated in FIG. 2, the actual spacing between the second preceding text line (first text line) and the preceding text line (second text line) is equal to a preset text line spacing. However, if no characters are contained in the fourth row of the preceding text line (second text line) and no characters are contained in the first and second rows of the current text line (third text line), the actual spacing between those two text lines becomes much larger than the preset text line spacing.

By eliminating or decreasing such wasted spaces, the consumption of printed paper can be reduced. If a medium is a display device, the number of characters displayed on the screen can be increased. Patent literature 1 describes an exemplary technique for decreasing space parts between text lines by making use of the characteristics of the Thai language, reducing the consumption of printed paper.

The technique described in Patent literature 1 divides each print text line for the Thai language into three rows, or upper, middle and lower parts, and prints these parts separately from one another upon printing.

When a print text line is divided into the three parts, or the upper, middle and lower parts, as described above, they are typically printed so that the upper and lower parts have the same height as the middle part. In fact, however, characters printed in the upper and lower parts have a shorter height than those printed in the middle part. Accordingly, the technique described in Patent literature 1 focuses on the point that the upper and lower parts each contain a larger vertical space. Specifically, the technique described in Patent literature 1 decreases the heights of the upper and lower parts to about half that of the middle part by cutting out space parts when printing the upper and lower parts. In this way, the height of each text line is decreased from three times (upper part+ middle part+lower part) to about two times (upper part with about halved height+middle part+lower part with about halved height) the height of the middle part. It is thus possible to decrease the height of each text line.

CITATION LIST

Patent Literature

{PTL1} JP2010-15462A

SUMMARY OF INVENTION

Technical Problem

As explained above, with the technique described in Patent literature 1 or the like, the consumption of paper can be reduced. These techniques, however, have the following two problems.

The first problem is that it is not possible to cause upper and lower text lines to overlap each other, in which case only a relatively small amount of paper consumption can be saved.

A reason is that the technique described in Patent literature 1 and the like fail to identify whether or not there is an area in which the lower part of an upper text line overlaps the upper part of a lower text line, although this identification is required to cause them to overlap each other. Furthermore, the lack of the ability to cause the upper text line to overlap the lower text line also leads to a problem that it is not possible to support a case where "no characters are contained in the fourth row of the preceding text line (second text line) and no characters are also contained in both the first and second rows of the current text line (third text line)" as illustrated in FIG. 2.

The second problem is that two characters printed in the upper part (characters printed in the first and second rows) are handled as a single one. Therefore, the difference in height between characters to be printed in the upper part is not considered. In this case, if no characters are printed in the first row, wasted space part may not be sufficiently eliminated.

A reason is that characters printed in the first and second rows are handled as a single one. In fact, although the first and second rows should be handled as two rows, they are handled simply as a single part, or an "upper part."

A exemplary object of the present invention is to provide an image data generating method, an image data generating device, and an image data generating program, which are capable of supporting combinations of various types of characters and reducing consumption of print paper when printing characters each formed of a plurality of rows.

Solution to Problem

According to a first aspect of the present invention, there is provided an image data generating device that generates image data, the image data having a configuration including two or more text lines, one or more columns contained in each text line, and two or more rows contained in each column, the image data being formed of a plurality of image data constituent elements, the image data generating device comprising:

a first data buffer retaining a first plurality of image data constituent elements contained in an upper text line of two vertically adjacent text lines out of the two or more text lines;

a second data buffer retaining a second plurality of image data constituent elements contained in a lower text line of the two vertically adjacent text lines out of the two or more text lines; and a data analysis section determining whether or not one image data constituent element out of the first plurality of image data constituent elements is present in a lower row of each column contained in the upper text line and whether or not one image data constituent element out of the second plurality of image data constituent elements is present in an upper row of each column contained in the lower text line, the data analysis section deciding whether to decrease a spacing between the two vertically adjacent text lines on the basis of the determination result, and determining a decreased width in a case where the spacing is decreased.

According to a second aspect of the present invention, there is provided an image data generating method performed by an image data generating device that generates image data, the image data having a configuration including two or more text lines, one or more columns contained in each text line, and two or more rows contained in each column, the image data being formed of a plurality of image data constituent elements, the image data generating method comprising:

retaining a first plurality of image data constituent elements contained in an upper text line of two vertically adjacent text lines out of the two or more text lines;

retaining a second plurality of image data constituent elements contained in a lower text line of the two vertically adjacent text lines out of the two or more text lines;

determining whether or not one image data constituent element out of the first plurality of image data constituent elements is present in a lower row of each column contained in the upper text line and whether or not one image data constituent element out of the second plurality of image data constituent elements is present in an upper row of each column contained in the lower text line; and deciding whether to decrease a spacing between the two vertically adjacent text lines on the basis of the determination result, and determining a decreased width in a case where the spacing is decreased.

According to a third aspect of the present invention, there is provided a computer readable recording medium that stores an image data generating program, the image data generating program causing a computer to function as an image data generating device that generates image data, the image data having a configuration including two or more text lines, one or more columns contained in each text line, and two or more rows contained in each column, the image data being formed of a plurality of image data constituent elements, the image data generating program causing the computer to perform an operation comprising:

retaining a first plurality of image data constituent elements contained in an upper text line of two vertically adjacent text lines out of the two or more text lines;

retaining a second plurality of image data constituent elements contained in a lower text line of the two vertically adjacent text lines out of the two or more text lines;

determining whether or not one image data constituent element out of the first plurality of image data constituent elements is present in a lower row of each column contained in the upper text line and whether or not one image data constituent element out of the second plurality of image data constituent elements is present in an upper row of each column contained in the lower text line; and deciding whether to decrease a spacing between the two vertically adjacent text lines on the basis of the determination result, and determining a decreased width in a case where the spacing is decreased.

Advantages Effects of the Invention

A exemplary effect of the present invention is to be able to support combinations of various types of characters and reduce consumption of print paper when printing characters each formed of a plurality of rows.

BRIEF DESCRIPTION OF DRAWINGS

{FIG. 8} A figure illustrates an exemplary printed Thai character for an individual pattern.

{FIG. 10} A figure illustrates an exemplary printed Thai character for an individual pattern.

{FIG. 11} A figure illustrates an exemplary printed Thai character for an individual pattern.

{FIG. 12} A figure illustrates an exemplary printed Thai character for an individual pattern.

{FIG. 13} A figure illustrates an exemplary printed Thai character for an individual pattern.

{FIG. 14} A figure illustrates an exemplary printed Thai character for an individual pattern.

{FIG. 18} A figure illustrates a configuration of a single column when a lower-case alphabetic letter is printed.

{FIG. 19} A figure illustrates print patterns of lower-case alphabetic letters.

{FIG. 21} A figure illustrates an exemplary printed lower-case alphabetic letter for an individual pattern.

{FIG. 22} A figure illustrates an exemplary printed lower-case alphabetic letter for an individual pattern.

{FIG. 23} A figure illustrates an exemplary printed lower-case alphabetic letter for an individual pattern.

{FIG. 24} A figure illustrates an exemplary printed lower-case alphabetic letter for an individual pattern.

REFERENCE SINGS LIST

Figure 1:
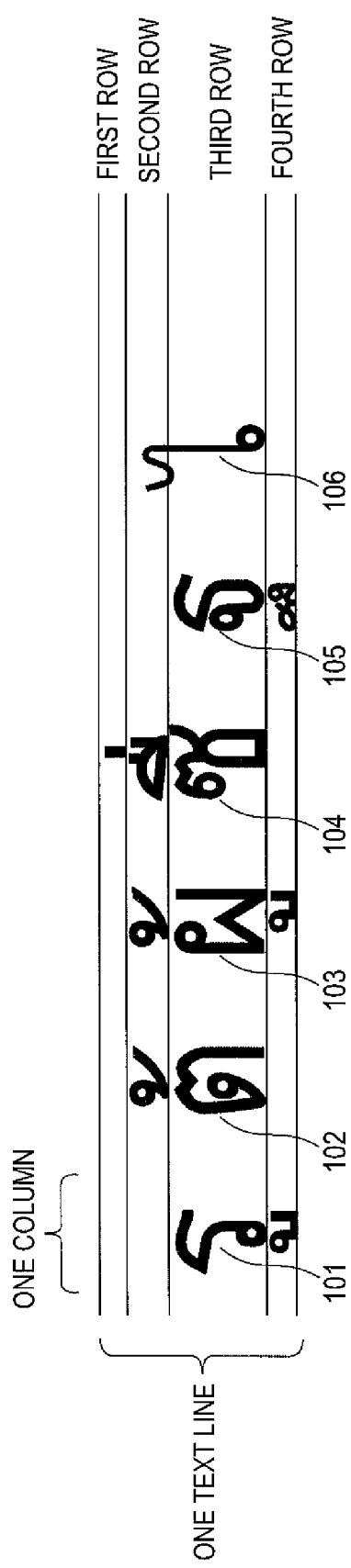
{FIG. 1} A figure illustrates a configuration of a single column when Thai characters are printed.

1, A1 host computer
2, A2 printer
3, A3 application program printer driver
5, A5 command interface section
6, A6 print data processing section
7, A7 character string analysis section
8, A8 print data buffer
9, A9 print image data generating section
10, A10 print image buffer
11, A11 preceding text line data buffer
12, A12 current text line data buffer
13, A13 print image receiving section
14, A14 print control section
A15 firmware
100, A100 print system

DESCRIPTION OF EMBODIMENTS

Figure 3:
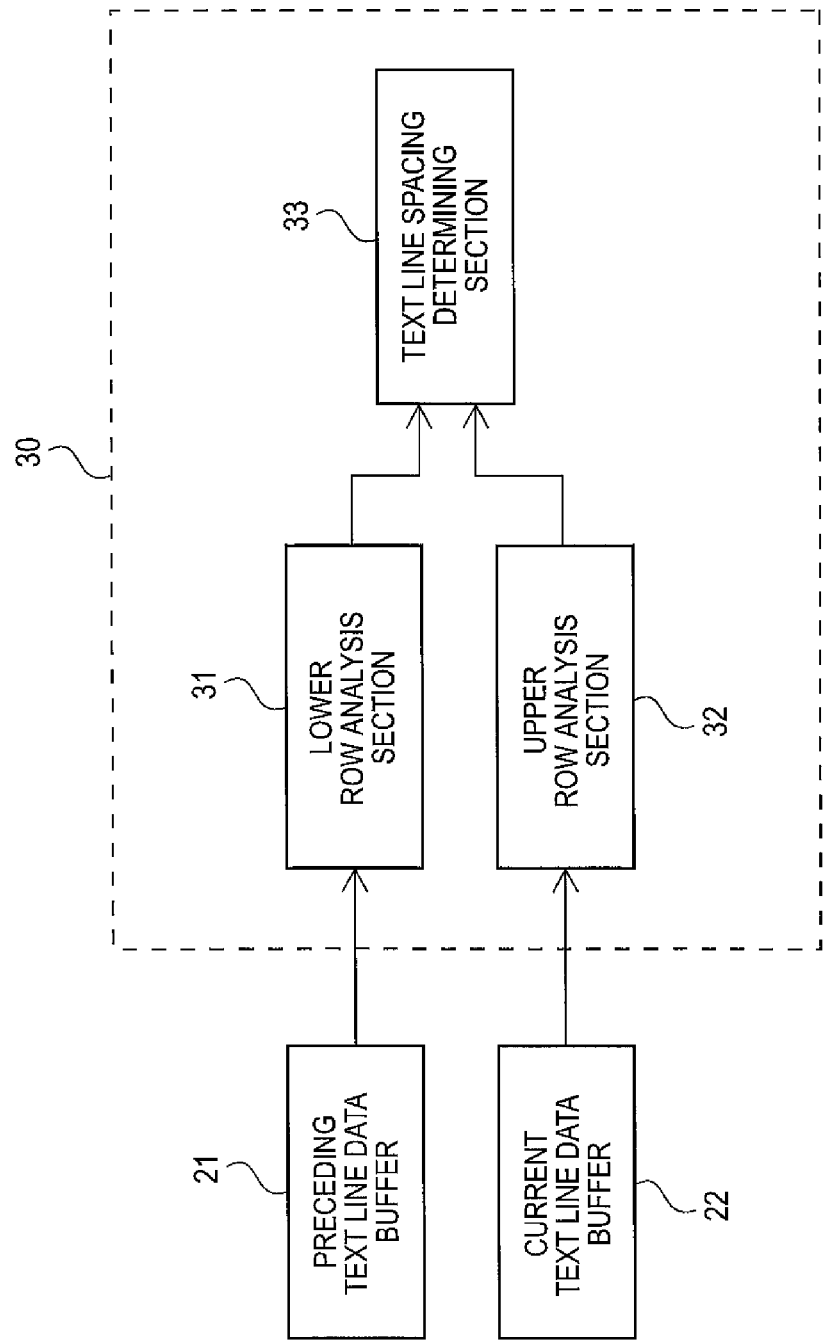
{FIG. 3} A figure illustrates a configuration of an embodiment of an image data generating device.

Exemplary embodiments of the present invention will be explained below using the accompanying drawings. FIG. 3 illustrates a configuration of an embodiment of an image data generating device. As illustrated in FIG. 3, this image data generating device includes a preceding text line data buffer 21, a current text line data buffer 22, and a data analysis section 30. The preceding text line data buffer 21 serves as a first data buffer; the current text line data buffer 22 serves as a second data buffer. The data analysis section 30 includes a lower row analysis section 31, an upper row analysis section 32, and a text line spacing determining section 33.

Figure 2:
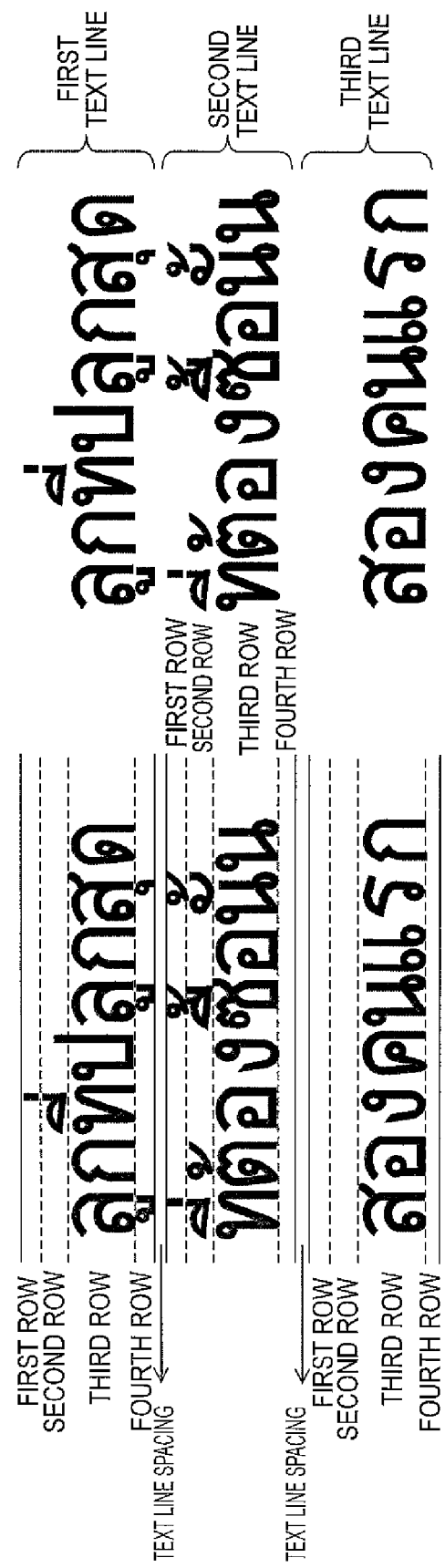
{FIG. 2} A figure illustrates an example in which a space part is created.

An operation of the image data generating device in FIG. 3 will be explained below by exemplifying a case where an image of Thai characters is generated. Piecemeal data of one text line in print data, as illustrated in FIG. 2, are temporarily stored in the preceding text line data buffer 21. For example, piecemeal data of the first text line in FIG. 2 are stored. In addition, piecemeal data of the next text line in print data are temporarily stored in the current text line data buffer 22. For example, piecemeal data of the second text line in FIG. 2 are stored.

The lower row analysis section 31 reads data contained in the preceding text line data buffer 21, and then determines whether or not any character is present in the lower row of each column in the data. Each character is a constituent element of the image data. For example, when the lower row, or the fourth row, of the first column in the first text line in FIG. 2 is determined, it is found that a character is present. When the lower row, or the fourth row, of the second column is determined, it is found that no character is present in the fourth row. The lower row analysis section 31 determines whether or not any character is contained in the lower row of each column in this manner, and thereby finds that characters are present in the lower rows of the first, fifth and seventh columns.

The upper row analysis section 32 reads data contained in the current text line data buffer 22, and then determines whether or not any character is present in the upper row of each column in the data. Each character is a constituent element of the image data (image data constituent element). For example, when the upper row, or both the first and second rows, of the first column in the second text line in FIG. 2 is determined, it is found that characters are contained in the respective rows. Likewise, when the upper row, or the first and second rows, of the second column is determined, it is found that a character is not present in the first row but present in the second row. Next, when the upper row, or the first and second rows, of the third column is determined, it is found that no characters are present in both the first and second rows. The upper row analysis section 32 determines whether or not any character is contained in the upper row of each column in this manner, and thereby finds that the characters are present in the respective first rows of the first, fifth and seventh columns and the respective second rows of the first, second, fifth and seven columns.

The text line spacing determining section 33 decides whether to decrease the spacing between two vertically adjacent text lines, on the basis of the determination results from both the lower row analysis section 31 and the upper row analysis section 32. Then, if having decided to decrease the spacing, the text line spacing determining section 33 determines the decreased width. For example, suppose the text line spacing determining section 33 decides not to decrease the text line spacing between the first and second text lines in FIG. 2 but to decrease the text line spacing between the second and third text lines, and determines the decreased width between the second and third text lines. Then, it decreases the spacing between the second and third text lines, for example, such that the space part between the fourth row in the second text line and both the first and second rows in the third text line is eliminated. By decreasing a text line spacing in this manner, the consumption of paper on which print data will be printed can be reduced. The individual sections in the data analysis section 30 illustrated in FIG. 3 are implemented in hardware; however the functions of the data analysis section 30 may be implemented by causing a CPU (Central Processing Unit) to execute a program stored in a memory.

Next, a print system incorporating the above image data generating device will be explained with reference to FIG. 4.

Figure 4:
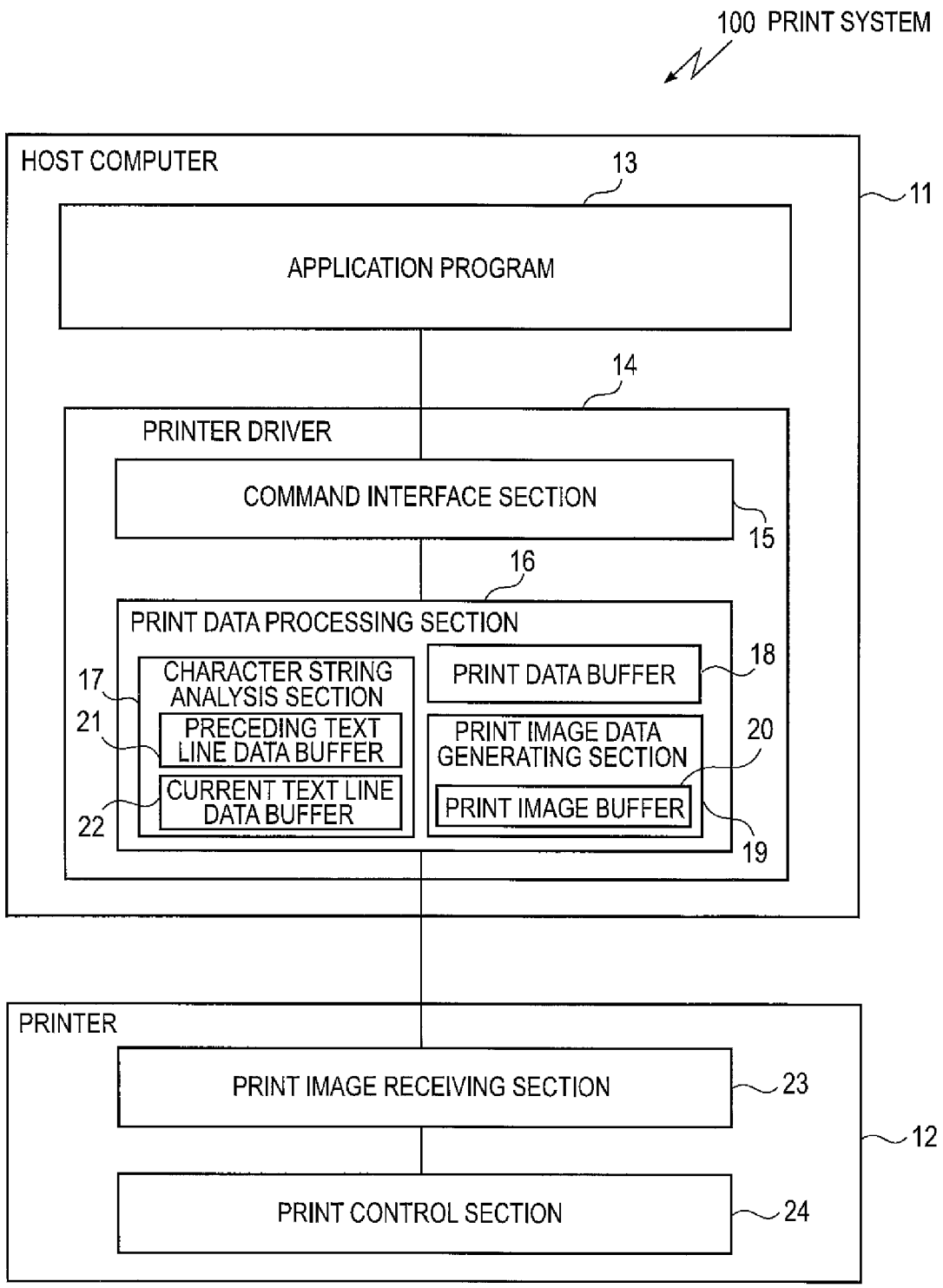
{FIG. 4} A figure illustrates a primary configuration of a first embodiment of the present invention.

Referring to FIG. 4, a print system 100 in this embodiment includes a host computer 11 and a printer 12. The print system 100 can be implemented in an arbitrary apparatus. For example, the print system 100 may be implemented as a receipt printer for POS (Point of sales). Alternatively, it may be implemented in a personal computer. It should be noted that a typical receipt printer for POS (Point of sales) prints receipts by using a fixed width font, in order to make the prices of items more visible by aligning them laterally with one another. In the explanation, prints are also made using a fixed width font in this embodiment.

This embodiment decreases space parts between text lines by making use of a characteristic of Thai or other similar languages in which the heights and vertical positions of printed characters in individual columns are not always the same as one another, thereby reducing the consumption of print paper.

In the following explanation, the first and second rows of each column for Thai characters are called a front row section, the third row is called a main section, and the fourth row is called a back row section, as appropriate. The first and second rows of each column for Thai characters correspond to an upper row; the fourth row corresponds to a lower row. A printed single-column is formed of one or more characters, and each character is a constituent element of image data (image data constituent element).

The host computer 11 includes an application program 13 and a printer driver 14. The printer driver 14 includes a command interface section 15 and a print data processing section 16. The print data processing section 16 includes a print data buffer 18, a character string analysis section 17, and a print image data generating section 19. The character string analysis section 17 includes the current text line data buffer 22 and the preceding text line data buffer 21. The print image data generating section 19 includes a print image buffer 20. The printer 12 includes a print image receiving section 23 and a print control section 24. The character string analysis section 17 configures the image data generating device; the printer driver 14 configures a print control device.

Each of the application program 13 and the printer driver 14 is software that operates in the host computer 11. The individual sections included in the host computer 11 are implemented by causing a computing device incorporated into the host computer 11 to perform computing processing based on both the application program 13 and the printer driver 14. The buffers included in the host computer 11 may be implemented by a plurality of storage devices or logically separated parts of a single storage device. The host computer 11 in itself may be implemented by a single device or the collaboration of a plurality of devices.

The application program 13 generates print data (character string) that are to be a print target. Then, the application program 13 transmits both print data and a command that directs the execution of print (execution order) to the command interface section 15 included in the printer driver 14. These print data are typically expressed by a character string; each character contained in the character string is typically expressed by a character code. Accordingly, the print data may be called text data.

The command interface section 15 performs a process of receiving the print data and the command (execution order) from the application program 13.

The print data buffer 18 included in the print data processing section 16 includes a function of temporarily accumulating the print data (character string) received from the application program 13 via the command interface section 15.

The character string analysis section 17 reads character strings in text line units from the print data buffer 18. Then, the character string analysis section 17 includes a function of analyzing the readout character strings and determining the heights of respective space parts between text lines.

The current text line data buffer 22 in the character string analysis section 17 temporarily stores the data when data regarding a single text line are read from the print data buffer 18. The preceding text line data buffer 21 in the character string analysis section 17 temporality stores data regarding a single text line which have been read previously.

The print image data generating section 19 includes a function of generating a print image (image data) on the basis of both the print data (character strings) and the heights of text line spacings which the character string analysis section 17 has determined. These print image data are typically formed of dot data, and these dot data may be compressed.

The print image buffer 20 in the print image data generating section 19 stores a print image in the course of the generation thereof.

The printer 12 has substantially the same configuration as a typical image printer, and prints image data.

The print image receiving section 23 receives the image data from the host computer 11, and passes it to the print control section 24. The print control section 24 outputs the print image received from the print image receiving section 23 to print paper.

Next, an operation in the present embodiment will be described in detail with reference to FIGS. 4 to 7 and 8 to 14.

In this embodiment, as described above, the application 13 gives a print order (command) and print data to the printer driver 14. A process that follows the reception of the print order and the print data is shown in a flowchart in FIG. 5.

Figure 5:
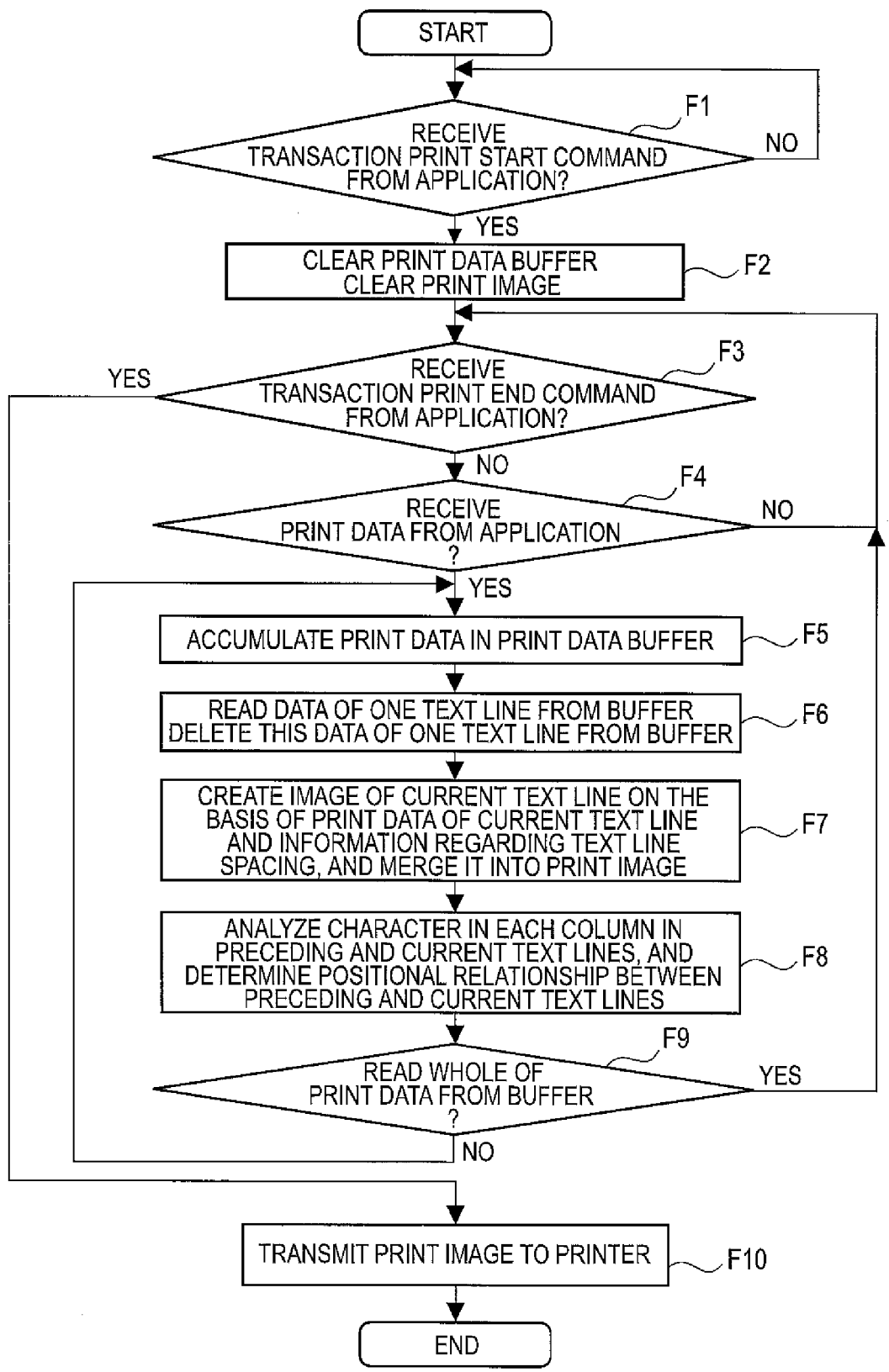
{FIG. 5} A figure shows a primary operation in each embodiment of the present invention.
Figure 6:
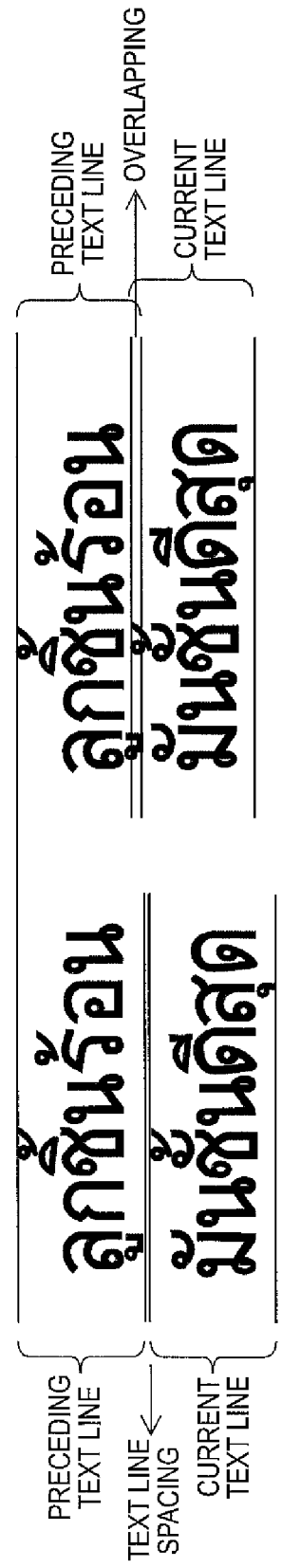
{FIG. 6} A figure illustrates overlapping upon printing.

In FIG. 5, no processes for commands other than Transaction Print (start and end) commands are described, but this is not intended to suggest that this embodiment cannot support commands other than the Transaction Print (start and end) commands. In this embodiment, the command interface section 15 in the printer driver 14 identifies the type of a command, and when the received command is not the Transaction Print (start or end) command, the printer driver 14 performs a process that is substantially the same as in a typical printer driver. This process, which is substantially the same as in a typical printer driver, is known by those skilled in the art. For this reason, processes for commands other than the Transaction Print (start and end) commands are illustratively omitted.

First, the printer driver 14 receives a Transaction Print start command from the application 13 (Yes at Step F1).

When receiving the Transaction Print start command, the printer driver 14 clears the print data buffer 18, the print image buffer 20 in the print image data generating section 19, and both the preceding text line data buffer 21 and the current text line data buffer 22 in the character string analysis section 17 (Step F2).

After that, the printer driver 14 waits until it has received print data from the application 13 (No at Step F4), except when receiving a Transaction Print end command from the application 13 (No at Step F3).

When the printer driver 14 receives print data from the application 13 (Yes at Step F4), it accumulates the print data in the print data buffer 18 (Step F5).

After that, the character string analysis section 17 first reads only print data regarding the first text line, from the print data buffer 18, and then stores them in the current text line data buffer 22. In addition, the character string analysis section 17 directs the print image data generating section 19 to create a print image from the character string for this text line. After directing the creation of the image, the character string analysis section 17 transfers the data from the current text line data buffer 22 to the preceding text line data buffer 21. Next, the character string analysis section 17 reads data regarding the next text line from the print data buffer 18 again, and then stores them in the current text line data buffer 22 (Step F6).

Further, the character string analysis section 17 conducts a data analysis by using the data in both the preceding text line data buffer 21 and the current text line data buffer 22 (Step F7).

The above data analysis is conducted for the purpose of determining the height of a space part in the text line spacing therebetween when the data regarding the previous and current text lines are printed.

The character string analysis section 17 judges whether or not any character is contained in the fourth row of each print column in the preceding text line and the first and second rows of each print column in the current text line. Then, the character string analysis section 17 determines the height of the space part in the text line spacing, on the basis of the combination of the contained characters. If the character string analysis section 17 judges that the overlapping is possible, it decides to cause the preceding text line to overlap the current text line as shown in the right part in FIG. 6. This overlapping enables the print spacing between the text lines to be decreased to smaller than that printed in a typical manner (refer to the left part in FIG. 6).

Figure 7:
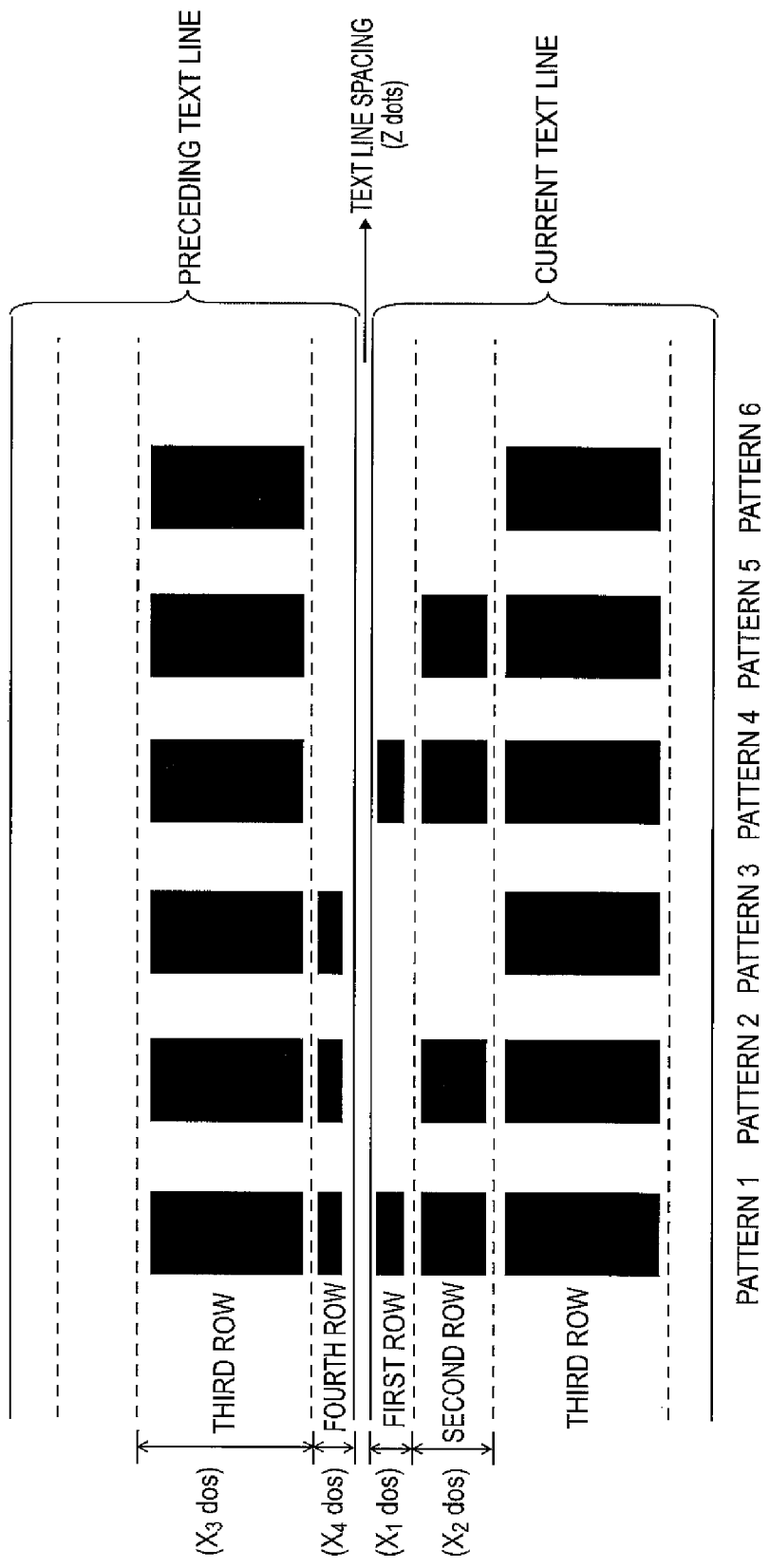
{FIG. 7} A figure illustrates print patterns of Thai characters.

The possible combination created by the three parts, or the fourth row of the preceding text line and the first and second rows of the current text line, has six conceivable patterns in total, and they are shown in FIG. 7.

Pattern 1 is a pattern in which characters are contained in the fourth row in the preceding text line and the first and second rows of the current text line.

Pattern 2 is a pattern in which a character is contained in the fourth row in the preceding text line, and a character is not contained in the first row in the current text line but contained in the second row therein.

Pattern 3 is a pattern in which a character is contained in the fourth row in the preceding text line, but no characters are contained in both the first and second rows in the current text line.

Pattern 4 is a pattern in which no character is contained in the fourth row in the preceding text line, but characters are contained in both the first and second rows in the current text line.

Pattern 5 is a pattern in which no characters are contained in both the fourth row in the preceding text line and the first row in the current text line, but contained in the second row in the current text line.

Pattern 6 is a pattern in which no characters are contained in the fourth row in the preceding text line and the first and second rows in the current text line.

Since only the three parts are considered this time, characters may or may not be contained in the first and second rows in the preceding text line and the fourth row in the current text line. More specifically, when an explanation will be given using FIG. 1, the following combinations are conceivable.

(1) For the patterns 1, 2 and 3, only the printed single-column 101 of FIG. 1 is described in the preceding text line, but the printed single-columns 103 and 105 of FIG. 1 are also included.

(2) The preceding text line in each of the patterns 4, 5 and 6 includes the printed single-columns 102, 104 and 106.

(3) For the patterns 2 and 5, only the printed single-column 102 of FIG. 1 is described in the current text line, but the printed single-columns 103 and 106 of FIG. 1 are also included.

(4) The current text line in each of the patterns 3 and 6 includes the printed single-columns 101 and 105 of FIG. 1.

When the character string analysis section 17 determines the height of the space part in the text line spacing by making use of the pattern division described above, it uses conditions listed below. FIGS. 8 to 14 show cases where the individual conditions are satisfied. In the left parts (A) in FIGS. 8 to 14, normally printed arrangements are shown when individual patterns are satisfied. In the right parts (B) in FIGS. 8 to 14, respective arrangements are shown, which are printed on the basis of the heights of the space parts that the character string analysis section 17 has determined Condition 1: at least one column that fits pattern 1 is present (FIG. 8(A)).

Figure 9B:
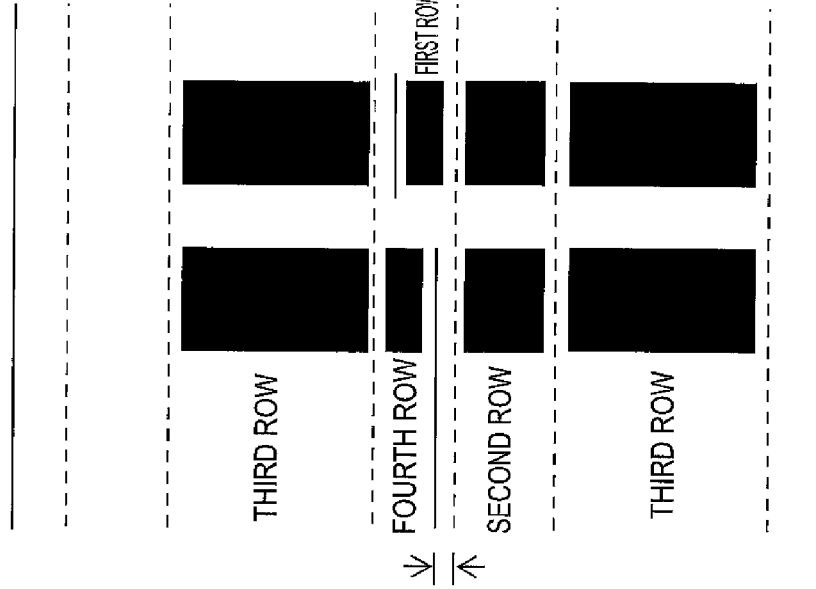
{FIG. 9} A figure illustrates an exemplary printed Thai character for an individual pattern.
Figure 9A:
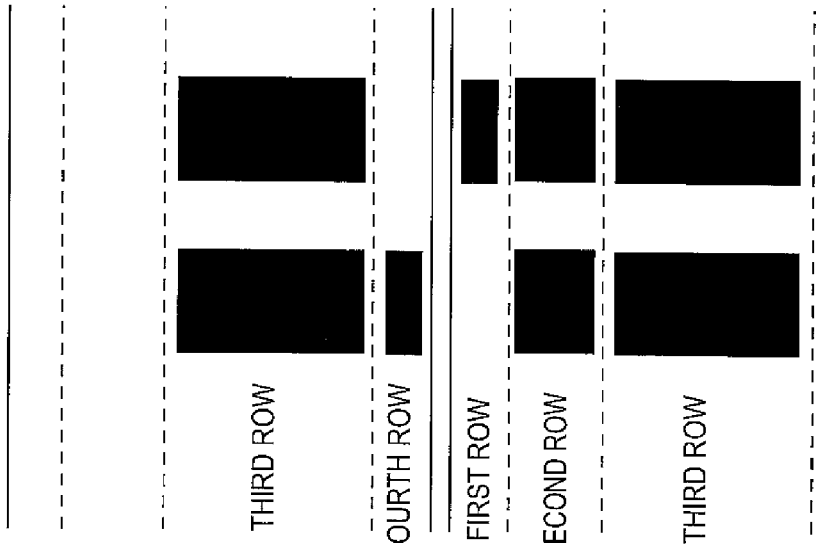

Condition 2: condition 1 is not satisfied, and at least one column that fits pattern 2 and at least one column that fits pattern 4 are present (FIG. 9(A)). (FIG. 9) includes a case where patterns 2 and 4 are replaced with each other or present away from each other. If condition 2 is satisfied, at least one part as in FIG. 9(A) is included, and parts as in FIG. 10(A) and 11(A) may also be included.

Condition 3: none of the conditions 1 and 2 is satisfied, and at least one column that that fits pattern 2 is present (FIG. 10(A)).

Condition 4: none of conditions 1 to 3 is satisfied, and at least one column that fits pattern 4 is present (FIG. 11(A)).

Condition 5: none of conditions 1 to 4 is satisfied, and at least one column that fits pattern 5 is present (FIG. 12(A)).

Condition 6: none of conditions 1 to 5 is satisfied and at least one column that fits pattern 3 is present (FIG. 13(A)).

Condition 7: none of conditions 1 to 6 is satisfied and at least one column that fits pattern 6 is present (FIG. 14(A)).

The character string analysis section 17 directs the print image generating section 19 to add a text line spacing to a lower part of the existing print image stored in the image buffer 20, on the basis of conditions that both the preceding text line data and the current text line data satisfy, as will be described later. Then, the character string analysis section 17 adds an image of the current text line data (Step F8).

A variable Z to be used in the following explanation refers to the height of a text line spacing which the application 13 has reported to the printer driver 14 via another command in advance (see FIG. 7).

If condition 1 is satisfied, the images are merged together, such that the height of the space part created between the fourth row in the preceding text line that is the lowermost text line in the existing print image and the first row of the current text line is set to Z dots (FIG. 8(B)).

If condition 2 is satisfied, the images are overlapped with each other, such that the heights of the space parts created between the fourth row that is the lowermost text line in the existing print image and the second row in the current text line and between the third row in the preceding text line that is the lowermost text line in the existing print image and the first row in the current text line are each set to the Z dots or above. Then, the overlapped images are merged together. It should be noted that at least one of the space parts are set to the Z dots (FIG. 9(B)).

From the viewpoint of the securing of the visibility, in fact, if condition 2 is satisfied, the merging may be performed in the manner as in FIG. 8(B) instead of that as in FIG. 9(B). This will be described later with reference to FIG. 16.

As described above, when condition 2 is satisfied, at least one part as in FIG. 9(A) is contained, and parts as in FIGS. 10(A) and 11(A) may also be contained. In the part as in FIG. 10(A), the images are merged together in a manner as in FIG. 10(B) that will be described later. Likewise, in the part as in FIG. 11(A), the images are merged together in a manner as in FIG. 11(B) that will be described later.

If condition 3 is satisfied, the images are merged together, such that the height of the space part created between the fourth row in the preceding text line that is the lowermost text line in the existing print image and the second row in the current text line is set to the Z dots (FIG. 10(B)).

If condition 4 is satisfied, the images are merged together, such that the height of the space part created between the third row of the preceding text line that is the lowermost text line in the existing print image and the first row in the current text line is set to the Z dots (FIG. 11(B)).

If condition 5 is satisfied, the images are merged together, such that the height of the space part created between the third row in the preceding text line that is the lowermost text line in the existing print image and the second row in the current text line is set to the Z dots (FIG. 12(B)).

If condition 6 is satisfied, the images are merged together, such that the height of the space part created between the fourth row in the preceding text line that is the lowermost text line in the existing print image and the third row in the current text line is set to the Z dots (FIG. 13(B)).

If condition 7 is satisfied, the images are merged together, such that the height of the space part created between the fourth row in the preceding text line that is the lowermost text line in the existing print image and the third row in the current text line is set to the Z dots (FIG. 14(B)).

After the images are merged together in the above manners, the print image data generating section 19 stores the resultant (new print image) in the print image buffer 20.

Next, the character string analysis section 17 checks whether or not any piece of data is still left in the print data buffer 18 (Step F9). If any piece of data is left (No at Step F9), it is set to a target, and Steps F5 to F7 will be repeated.

If no pieces of data are left in the print data buffer 18 (Yes at Step F9), namely, if all the pieces of data have been read from the print data buffer 18, the current procedure proceeds to the step of verifying a print command from the application 13 and print (Step F3).

If the application 13 has not transmitted a Transaction Print end command to the printer driver 14 at Step F3 in FIG. 5 (No at Step F3) but successively transmits print data to the printer driver 14 (Yes at Step F4), the printer driver 14 repeats Steps F5 to F8 again.

Finally, at the time of receiving a Transaction Print end command from the application 13 (Yes at Step F3), the print data image generating section 19 transmits the print image in the print image buffer to the printer 12, and directs it to print this image (Step F10).

The present embodiment explained above analyzes a print content, thereby minimizing a wasted space part created in a text line spacing when printing Thai text. Thus, this embodiment is effective in reducing the consumption of print paper.

A reason for the above is that it is possible to shorten a vertical print length by overlapping printed text lines.

Next, another embodiment, or a second embodiment, of the present invention will be explained in detail with reference to the accompanying drawing.

Figure 15:
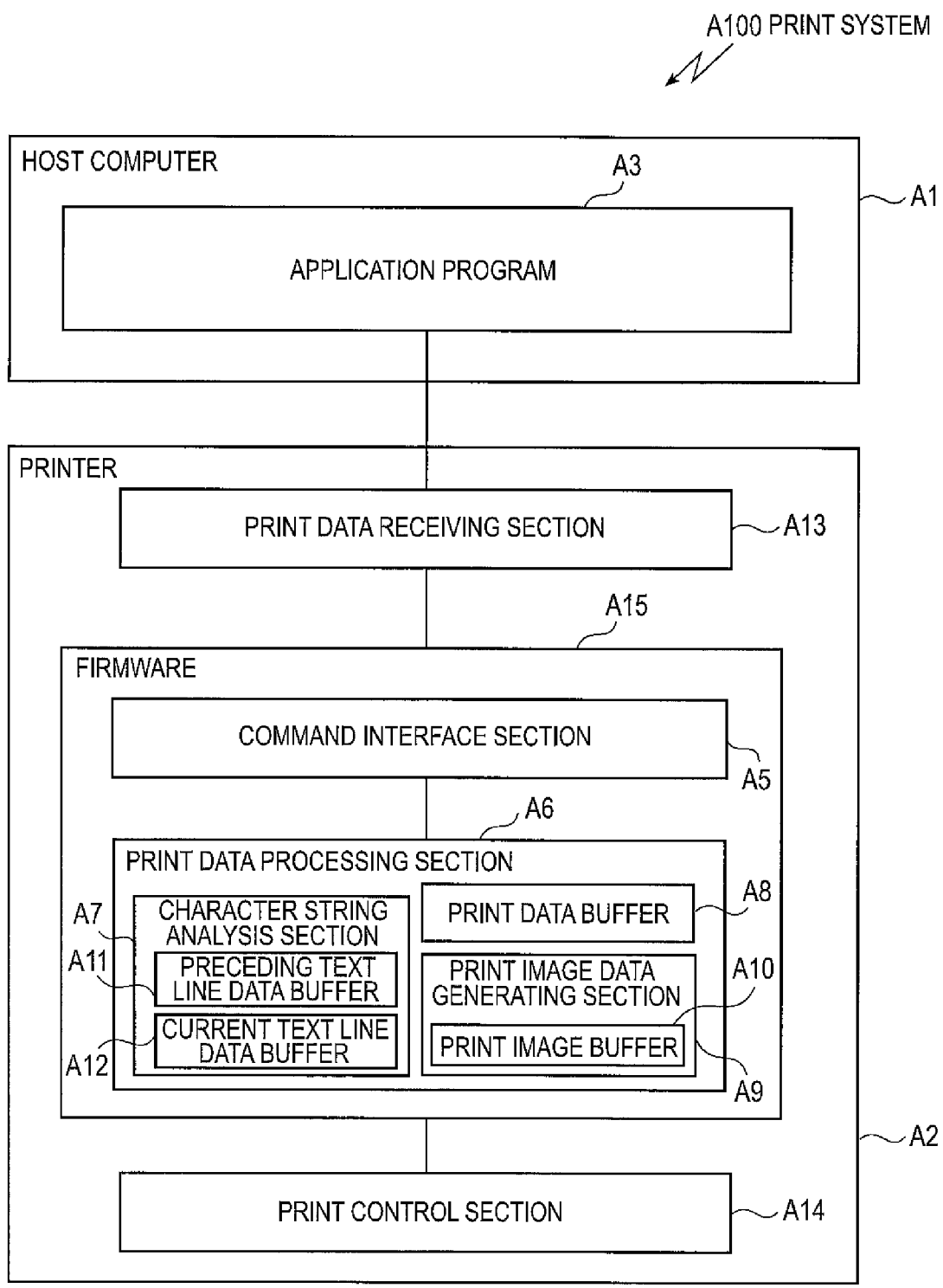
{FIG. 15} A figure illustrates a primary configuration of a second embodiment of the present invention.

Referring to FIG. 15, a print system A100 in the second embodiment differs in that all the functions of the printer driver 14 illustrated in FIG. 4 are incorporated into a firmware A15 in a printer.

In the second embodiment, an application A3 transmits a Transaction Print start command, print data, and a Transaction Print end command to the printer A2.

When a data receiving section A13 in the printer driver A2 receives a command or data from the application, it passes the command or data to a command interface section A5. The command interface section A5 and a print data processing section A6 operate in substantially the same manners as the command interface section 15 and the print data processing section 16, respectively, in the first embodiment.

If the first embodiment described above is utilized, a printer manufacturer needs to provide customers with print systems in which the first embodiment is applied to all the printer drivers for support-targeted operating systems. In contrast, if the second embodiment is utilized, it is possible to eliminate the need to change printer drivers, depending on an operating system for a host computer. For this reason, the second embodiment can reduce development costs in comparison with the first embodiment.

Next, still another embodiment, or a third embodiment, of the present invention will be explained with reference to the accompanying drawings.

Figure 16:
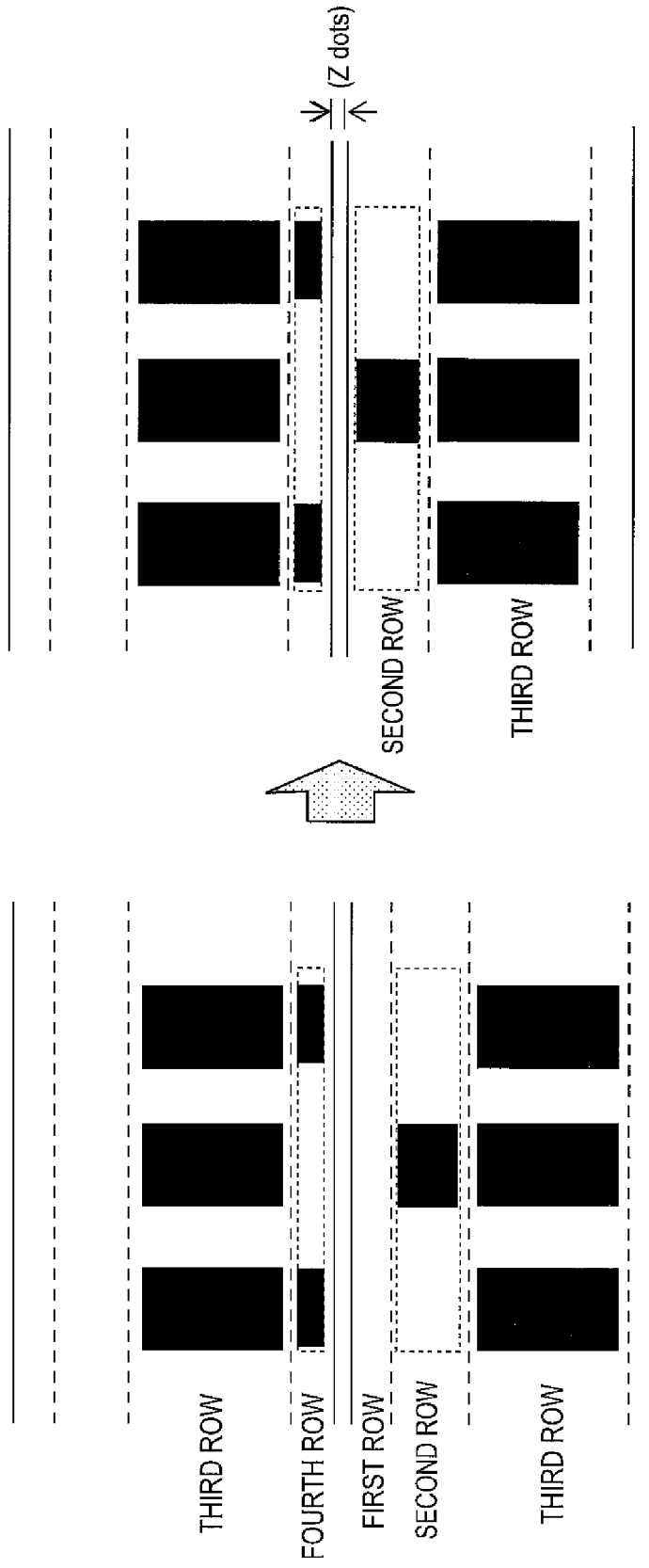
{FIG. 16} A figure illustrates an exemplary printed character in a third embodiment of the present invention.

Referring to FIG. 16, this embodiment considers adjacent columns. The first embodiment and the second embodiment comply with a precondition that the lower part (fourth row) of each print column in the preceding text line does not overlap the upper part (first and second rows) of a corresponding print column in the current text line, and determines the height of the space part in the text line spacing such that the space part is minimized. In contrast, the third embodiment considers adjacent columns, in order to prevent characters from being printed excessively adjacent to one another, thereby ensuring the readability. More specifically, the third embodiment decides whether to decrease the spacings between two vertically adjacent text lines and determines the decreased widths in a case where the spacings are decreased, on the basis of the non-overlapped condition and readability.

In an example illustrated in FIG. 16, a character is present in the second row of the center column in the current text line, but not present in the fourth row of the same column in the preceding text line. If the rule provided in the explanation of the first embodiment is applied to this example, an arrangement in FIG. 12 is obtained. However, if the arrangement in FIG. 12 is applied to the example illustrated in FIG. 16, the characters in the second row of the center column in the current text line and the fourth rows of both side columns in the preceding text line are contiguously arranged in the lateral direction. This arrangement may lower the readability. Therefore, the third embodiment considers the presence of characters in the fourth rows of the adjacent columns in the preceding text lines, applying the arrangement in FIG. 10.

Figure 17:
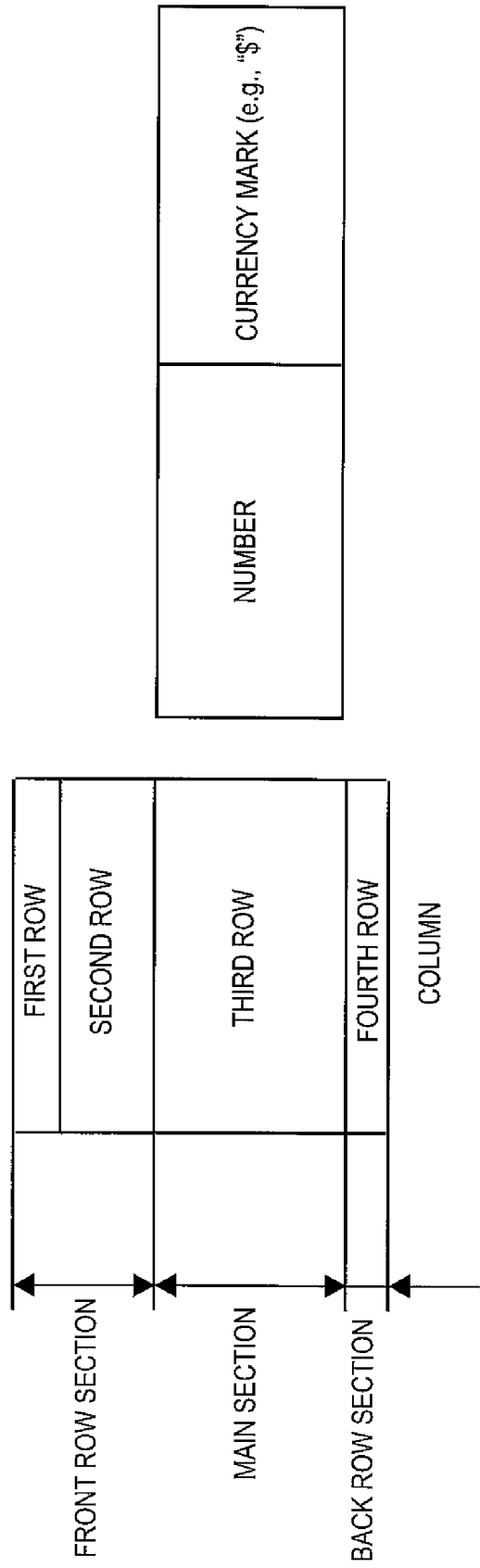
{FIG. 17} A figure illustrates an addition of a currency mark to a Thai character.

The embodiments explained above are particularly suitable for receipts printed by and output from a POS device. Specifically, the embodiments are expected to be applied to text line spacings of an item name, its price and its currency mark (Baht) sequentially printed. Accordingly, it is preferable for the height of a number and a currency mark to be the same as that of the third column in each column as illustrated in FIG. 17 or smaller than that of the third column.

A fourth embodiment will be explained with reference to FIGS. 18 to 25. Differences from the first embodiment will be described below.

The fourth embodiment supposes lower-case alphabetic letters are formed (printed) in each text line, instead of Thai characters.

Lower-case alphabetic letters can be classified into four types as illustrated in FIG. 18. In addition, a precondition that each alphabet has any description in the second row is applied.

Each lower-case alphabetic letter can be classified into four types: type 1 in which a description is always present only in the second row; type 2 in which a description bridges the first and second rows; type 3 in which a description bridges the second and third rows; and type 4 in which a description bridges the first and third rows. For example, the letters "a," "b," "q" and "j" are classified into types 1 to 4, respectively.

For each column, the relationship between a preceding text line and a current text line has four patterns illustrated in FIG. 19.

Pattern 1 is a pattern in which type 3 in FIG. 18 is contained in the preceding text line and type 2 in FIG. 18 is contained in the current text line.

Pattern 2 is a pattern in which type 3 in FIG. 18 is contained in the preceding text line and type 1 in FIG. 18 is contained in the current text line.

Pattern 3 is a pattern in which type 1 in FIG. 18 is contained in the preceding text line and type 2 in FIG. 18 is contained in the current text line.

Pattern 4 is a pattern in which type 1 in FIG. 18 is contained in the preceding text line and type 1 in FIG. 18 is contained in the current text line.

Letters may or may not be contained in the first row of the preceding text line and the third row of the current text line this time, because only the relationship between the third row of the preceding text line and the first row of the current text line is considered. Accordingly, combinations listed below are also conceivable.

(1) Type 3 in FIG. 18 is illustrated in the preceding text line for patterns 1 and 2, but type 4 may also be contained in the preceding text line for patterns 1 and 2.

(2) Type 1 in FIG. 18 is illustrated in the preceding text line for patterns 3 and 4, but type 2 in FIG. 18 may also be contained in the preceding text line for patterns 3 and 4.

(3) Type 2 in FIG. 18 is illustrated in the current text line for patterns 1 and 3, but type 4 in FIG. 18 may also be contained in the current text line for patterns 1 and 3.

(4) Type 1 in FIG. 18 is illustrated in the current text line for patterns 2 and 4 and is only described, but type 3 in FIG. 18 may also be contained in the current text line for patterns 2 and 4.

When a character analysis section A7 determines the heights of the space parts in the text line spacings by making use of the pattern identification described above, the conditions listed below are used. FIGS. 20 to 24 show cases where the individual conditions are satisfied. In the left parts (A) in FIGS. 20 to 24, normally printed arrangements are shown when individual patterns are satisfied. In the right parts (B) in FIGS. 20 to 24, respective arrangements are shown, which are printed on the basis of the heights of the space parts which the character string analysis section 7 has determined.

Figure 20A:
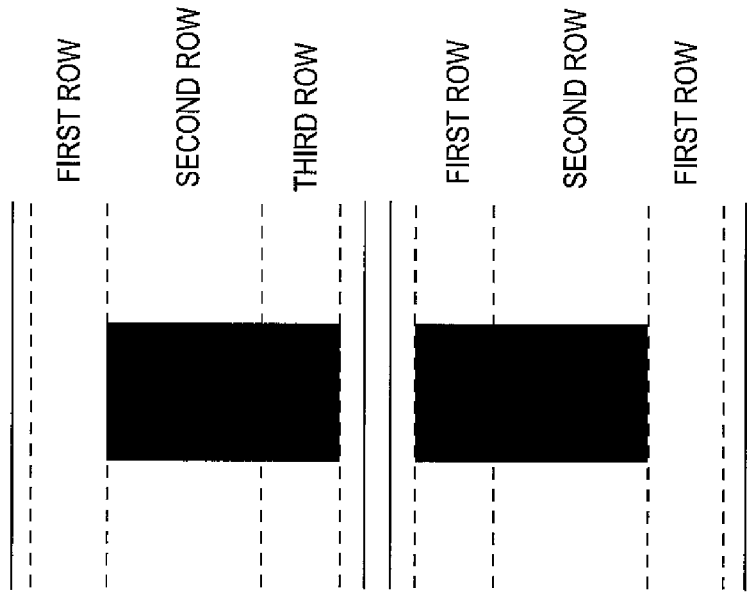
{FIG. 20} A figure illustrates an exemplary printed lower-case alphabetic letter for an individual pattern.

Condition 1: at least one column that fits pattern 1 is present (FIG. 20(A)).

Condition 2: condition 1 is not satisfied, and at least one column that fits pattern 2 and at least one column that fits pattern 3 are present (FIG. 21(A)). FIG. 21 includes a case where patterns 2 and 3 are replaced with each other or present away from each other.

Condition 3: none of the conditions 1 and 2 is satisfied, and at least one column that that fits pattern 2 is present (FIG. 22(A)).

Condition 4: none of conditions 1 to 3 is satisfied, and at least one column that fits pattern 3 is present (FIG. 23(A)).

Condition 5: none of conditions 1 to 4 is satisfied, and at least one column that fits pattern 4 is present (FIG. 24(A)).

Figure 20B:
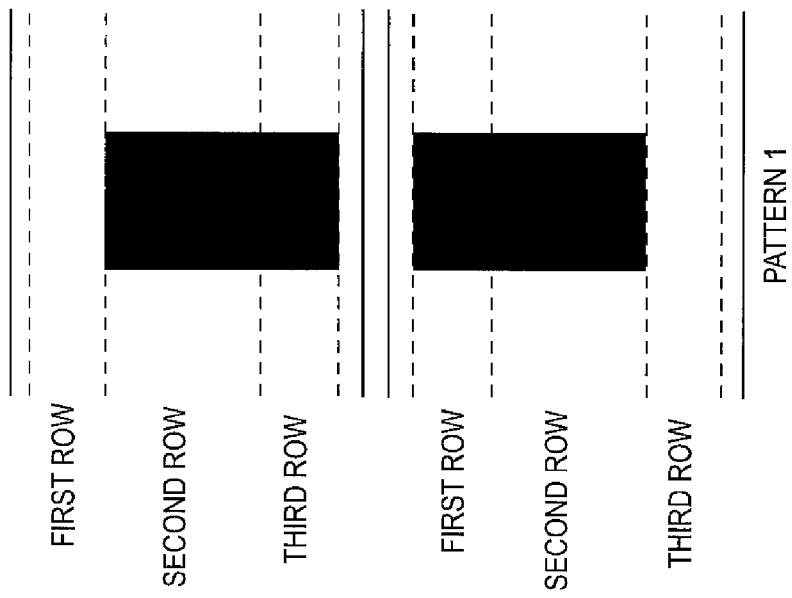

If condition 1 is satisfied, the spacing between the preceding text line and the current text line is set to the Z dots (FIG. 20(B)).

If condition 2 is satisfied, the images are overlapped with each other, such that at least one of the spacings between the third row in the preceding text line and the second row in the current text line and between the second row in the preceding text line and the first row in the current text line is set to the Z dots. If the heights of the first and third rows are the same as each other, the spacings between the third row in the preceding text line and the second row in the current text line and between the second row in the preceding text line and the first row in the current text line are the Z dots. If the heights of the first and third rows are not the same as each other, the other spacing that is not the Z dots is equal to or smaller than the Z dots (FIG. 21(B)). The merging may be performed in the manner as in FIG. 20(B) instead of that as in FIG. 21(B).

If condition 3 s satisfied, the spacing between the preceding text line and the current text line is decreased by the amount corresponding to the height of the first row of the current text line so that it is set to the Z dots (FIG. 22(B)).

If condition 4 is satisfied, the spacing between the preceding text line and the current text line is decreased by the amount corresponding to the height of the third row of the preceding text line so that it is set to the Z dots (FIG. 23(B)).

If condition 5 is satisfied, the spacing between the preceding text line and the current text line is decreased by the amount corresponding to both the heights of the third row in the preceding text line and the first row in the current text line, so that it is set to the Z dots (FIG. 24(B)).

Figure 25:
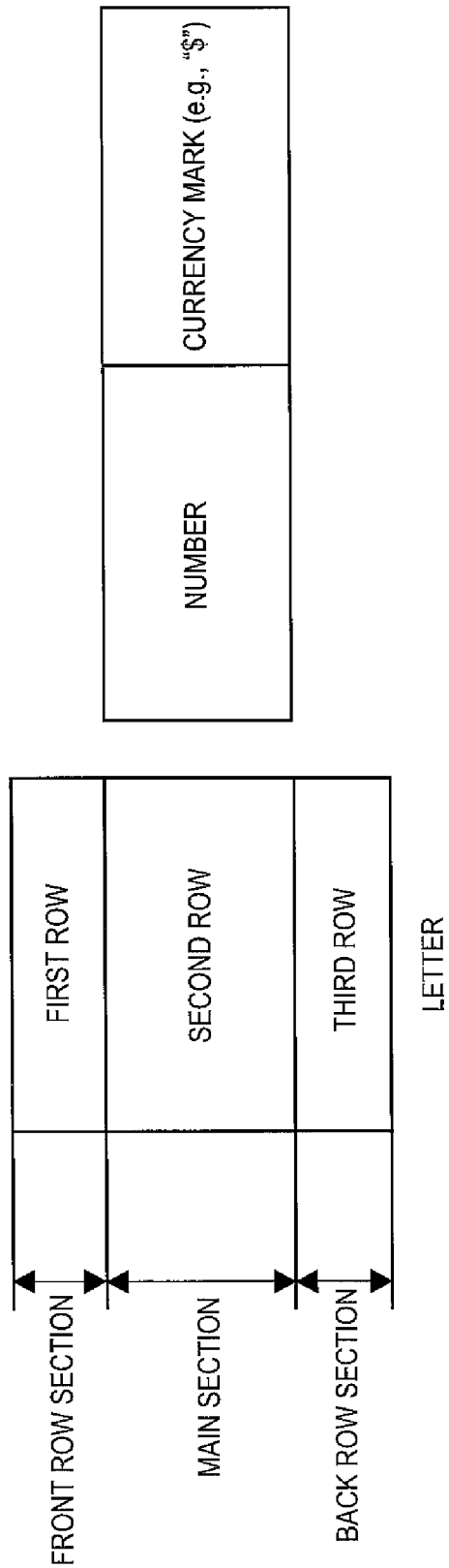
{FIG. 25} A figure illustrates an addition of a currency mark to a lower-case alphabetic letter.

The fourth embodiment is also particularly suitable for receipts printed by and output from a POS device. Specifically, this embodiment is expected to be applied to text line spacings of an item name, its price and its currency mark (dollar) sequentially printed. Accordingly, it is preferable for the height of a number and a currency mark to be the same as that of the second row of a letter as illustrated in FIG. 25 or not to exceed that of the second row of a letter.

The first, second and third rows of a lower-case alphabetic letter are called a front row section, a main section, and a back row section, respectively. The first and third rows of a lower-case alphabetic letter correspond to an upper row and a lower row, respectively; the main section is not included in both the upper and lower rows. A printed single-columned letter is formed of a single letter. For example, the letter "a" is formed of a single image data constituent element; the letter "j" is formed of three image constituent elements.

The first and fourth embodiments have been explained regarding cases of using Thai characters and lower-case alphabetic letters, respectively. However, it should be noted that the present invention is applicable, provided that a character or letter has: a main section in which a character is always present in each column; and upper and lower rows in which the presence of a character depends on the character/letter and the column. Thus, Thai characters and lower-case alphabetic letters are simply explanatory examples, and the scope of application of each embodiment is limited to neither Thai characters nor lower-case alphabetic letters.

It should be understood that the configuration of the first embodiment illustrated in FIG. 4 can implement both the third and fourth embodiments. Furthermore, the configuration of the second embodiment illustrated in FIG. 15 can also implement both the third and fourth embodiments.

The print systems described above can be implemented in hardware, software or their combination. Print control methods performed by the above print systems can also be implemented in hardware, software or their combination. Herein, the expression "implemented by software" means implemented by causing a computer to read and execute a program.

A program can be stored using various types of non-transitory computer readable media, and supplied to computers. Non-transitory computer readable media include various types of tangible storage media. Exemplary non-transitory computer readable media include magnetic recording media (e.g., a flexible disk, a magnetic tape and a hard disk drive), magneto-optical recording media (e.g., a magneto-optical disk), a CD-ROM (Read Only Memory), a CD-R, a CD-R/W, and semiconductor memories (e.g., a mask ROM, a PROM (Programmable ROM), an EPROM (Erasable PROM), a flash ROM, and a RAM (random access memory)). Moreover, a program may be supplied to computers via various types of transitory computer readable media. Exemplary transitory computer readable media include an electrical signal, an optical signal and an electromagnetic wave. A transitory computer readable medium can supply programs to computers through a wired communication path, such as an electrical wire or an optical fiber, or a wireless communication path.

The representative embodiments of the present invention have been explained. However, the present invention can be implemented in other various forms without departing from its spirit or primary feature specified by the claims in the present application. Therefore, the embodiments described above are simply exemplary, and are not intended to be interpreted in a limiting sense. The scope of the present invention is shown by the claims, and is not restricted by the descriptions of the specification and abstract. Furthermore, all possible modifications and variations pertaining to the scope of the equivalents of the claims are within the scope of the present invention.

This application claims the priority benefit on the basis of Japanese Priority Patent Application 2012-074481 filed in Mar. 28, 2012. The content of 2012-074481 is incorporated into that of the specification in this application.

Part or all of the above embodiments can be described as in Supplementary notes described below, but they are not limiting.

(Supplementary note 1) An image data generating device that generates image data, the image data having a configuration including two or more text lines, one or more columns contained in each text line, and two or more rows contained in each column, the image data being formed of a plurality of image data constituent elements, the image data generating device comprising:

a first data buffer retaining a first plurality of image data constituent elements contained in an upper text line of two vertically adjacent text lines out of the two or more text lines;

a second data buffer retaining a second plurality of image data constituent elements contained in a lower text line of the two vertically adjacent text lines out of the two or more text lines; and a data analysis section determining whether or not one image data constituent element out of the first plurality of image data constituent elements is present in a lower row of each column contained in the upper text line and whether or not one image data constituent element out of the second plurality of image data constituent elements is present in an upper row of each column contained in the lower text line, the data analysis section deciding whether to decrease a spacing between the two vertically adjacent text lines on the basis of the determination result, and determining a decreased width in a case where the spacing is decreased.

(Supplementary note 2) The image data generating device according to Supplementary note 1, where the data analysis section decides whether to decrease the spacing between the two vertically adjacent text lines in the case of satisfying a non-overlapped condition that the image data constituent elements do not overlap with each other in each column in the two vertically adjacent text lines, and determines the decreased width in a case where the spacing is decreased.

(Supplementary note 3) The image data generating device according to Supplementary note 2, wherein the data analysis section decides whether to decrease the spacing between the two vertically adjacent text lines on the basis of the non-overlapped condition and readability, and determines the decreased width in a case where the spacing is decreased.

(Supplementary note 4) The image data generating device according to any one of Supplementary notes 1 to 3, wherein with respect to each column pair of the two vertically adjacent text lines, the data analysis section determines whether or not one image data constituent element of the first plurality of image data constituent elements is present in a lower part of a column of the upper text line and one image data constituent element of the second plurality of image data constituent elements is present in an upper part of a column of the lower text line, the data analysis section determines which of preset patterns each combination of the columns in the two vertically adjacent text lines fits, and the data analysis section decides whether to decrease a spacing between the two vertically adjacent text lines on the basis of a combination of the respective patterns that the column pairs contained in the two vertically adjacent text lines fit, and determines a decreased width in a case where the spacing is decreased.

(Supplementary note 5) The image data generating device according to Supplementary note 4, wherein the data analysis section prepares, in advance, conditions that the combination of the patterns will satisfy and decreased amounts corresponding to the conditions, and the data analysis section determines which of the conditions the combination of the patterns actually satisfies, and applies one of the decreased amounts which corresponds to the satisfied condition to the spacing between the two vertically adjacent text lines.

(Supplementary note 6) An image data generating method performed by an image data generating device that generates image data, the image data having a configuration including two or more text lines, one or more columns contained in each text line, and two or more rows contained in each column, the image data being formed of a plurality of image data constituent elements, the image data generating method comprising:

retaining a first plurality of image data constituent elements contained in an upper text line of two vertically adjacent text lines out of the two or more text lines;

retaining a second plurality of image data constituent elements contained in a lower text line of the two vertically adjacent text lines out of the two or more text lines;

determining whether or not one image data constituent element out of the first plurality of image data constituent elements is present in a lower row of each column contained in the upper text line and whether or not one image data constituent element out of the second plurality of image data constituent elements is present in an upper row of each column contained in the lower text line; and deciding whether to decrease a spacing between the two vertically adjacent text lines on the basis of the determination result, and determining a decreased width in a case where the spacing is decreased.

(Supplementary note 7) An image data generating program causing a computer to function as an image data generating device that generates image data, the image data having a configuration including two or more text lines, one or more columns contained in each text line, and two or more rows contained in each column, the image data being formed of a plurality of image data constituent elements, the image data generating program causing the computer to perform an operation comprising:

retaining a first plurality of image data constituent elements contained in an upper text line of two vertically adjacent text lines out of the two or more text lines;

retaining a second plurality of image data constituent elements contained in a lower text line of the two vertically adjacent text lines out of the two or more text lines;

determining whether or not one image data constituent element out of the first plurality of image data constituent elements is present in a lower row of each column contained in the upper text line and whether or not one image data constituent element out of the second plurality of image data constituent elements is present in an upper row of each column contained in the lower text line; and deciding whether to decrease a spacing between the two vertically adjacent text lines on the basis of the determination result, and determining a decreased width in a case where the spacing is decreased.

(Supplementary note 8) A computer readable recording medium that stores an image data generating program, the image data generating program causing a computer to function as an image data generating device that generates image data, the image data having a configuration including two or more text lines, one or more columns contained in each text line, and two or more rows contained in each column, the image data being formed of a plurality of image data constituent elements, the image data generating program causing the computer to perform an operation comprising:

retaining a first plurality of image data constituent elements contained in an upper text line of two vertically adjacent text lines out of the two or more text lines;

retaining a second plurality of image data constituent elements contained in a lower text line of the two vertically adjacent text lines out of the two or more text lines;

determining whether or not one image data constituent element out of the first plurality of image data constituent elements is present in a lower row of each column contained in the upper text line and whether or not one image data constituent element out of the second plurality of image data constituent elements is present in an upper row of each column contained in the lower text line; and deciding whether to decrease a spacing between the two vertically adjacent text lines on the basis of the determination result, and determining a decreased width in a case where the spacing is decreased.

(Supplementary note 9) A print control device that performs control in such a way that a print target is printed in a format in which each printed column contained in each text line includes two or more rows, the print control device comprising:

a unit receiving a print target that does not always contain a content to be printed in an upper or lower row as the print target;

a unit noting two adjacent text lines in the received print target, when one or both of a lower row in an upper text line out of the two adjacent text lines and an upper row in a lower text line out of the two adjacent text lines do not contain the content to be printed, the unit deciding to reduce a space part in a text line spacing between the two text lines to smaller than when the content to be printed is contained therein; and a unit outputting an instruction to print the print target on the basis of the decided space part.

(Supplementary note 10) The print control device according to Supplementary note 9, wherein the reduction is made by causing the lower row in the upper text line out of the noted two text lines to overlap the upper row in the lower text line out of the noted two text lines.

(Supplementary note 11) The print control device according to Supplementary note 9 or 10, wherein when the print target is columns or characters each of which includes: a main section that is present in all columns or all characters; a front row section that is not present depending on a column or character and positioned above the main section; and a back row section that is not present depending on a column or character and positioned below the main section, a distance between the main sections in a first text line and a second text line is determined depending on whether or not the back row section in the first text line and the front row section in the second text line are present, the second text line following the first text line.

(Supplementary note 12) The print control device according to one of Supplementary notes 9 to 11, wherein the reduction is decided to be made even when the content to be printed is contained in a lower row of a certain column in the upper text line out of the two noted text lines but not contained in a lower row of another column therein and the content to be printed is contained in an upper row of a certain column in the lower text line out of the two noted text lines but not contained in an upper row of another column therein.

(Supplementary note 13) The print control device according to one of Supplementary notes 9 to 12, wherein the reduction is not made when the content to be printed is not contained in a lower row of a first column in the upper text line out of the two noted text lines but is contained in an upper row of the first column in the lower text line out of the two noted text lines and the content to be printed is contained in a lower row of a second column in the upper text line out of the two noted text lines but not contained in an upper row of the second column in the lower text line out of the two noted text lines, the second column adjoining to the first column.

(Supplementary note 14) The print control device according to one of Supplementary notes 9 to 13, wherein a character or mark indicating a unit is described in a row positioned between the upper row and lower row.

(Supplementary note 15) The print control device according to any one of Supplementary notes 9 to 14, further comprising a unit making a print in response to the print instruction.

(Supplementary note 16) A print control method performed by a control device, the control device performing control in such a way that a print target is printed in a format in which each printed column includes a plurality of rows, the print control method comprising the steps of:

receiving a print target that does not always contain a content to be printed in an upper or lower row as the print target;

noting two adjacent text lines in the received print target, when one or both of a lower row in an upper text line out of the two adjacent text lines and an upper row in a lower text line out of the two adjacent text lines do not contain the content to be printed, deciding to reduce a space part in a text line spacing between the two text lines to smaller than when the content to be printed is contained therein; and outputting an instruction to print the print target on the basis of the decided space part.

(Supplementary note 17) A print control program that causes a computer to function as a print control device, the print control device performing control in such a way that a print target is printed in a format in which each printed column includes a plurality of rows, the print control program causing the computer to perform an operation comprising:

receiving a print target that does not always contain a content to be printed in an upper or lower row as the print target;

noting two adjacent text lines in the received print target, when one or both of a lower row in an upper text line out of the two adjacent text lines and an upper row in a lower text line out of the two adjacent text lines do not contain the content to be printed, deciding to reduce a space part in a text line spacing between the two text lines to smaller than when the content to be printed is contained therein; and outputting an instruction to print the print target on the basis of the decided space part.

{Industrial Applicability}

The present invention can be used for image data output devices. Exemplary image data output devices include printers and display devices. The invention can be used for printers in order to save paper. The invention can be used for display devices in order to increase the number of characters or letters appearing on the display section.

The invention claimed is:

1. An image data generating device that generates image data, the image data comprising two or more text lines and a configuration including one or more columns contained in each text line,
    wherein presence or absence of a content in each of upper and lower rows of each column in each text line is dependent on a text line and a column,
    the image data generating device comprising a text line spacing determining section determining whether or not the content is present in a lower row of each column contained in an upper text line of two vertically adjacent text lines and whether or not the content is present in an upper row of each column contained in a lower text line of the two vertically adjacent text lines,
    the text line spacing determining section determining, on the basis of the determination result, whether to decrease a spacing between the two vertically adjacent text lines and how much the spacing is decreased in a case where the spacing is decreased.

2. The image data generating device according to claim 1, wherein
    the text line spacing determining section determines whether to decrease the spacing between the two vertically adjacent text lines and how much the spacing is decreased in a case where the spacing is decreased, in the case of satisfying a non-overlapped condition that the content does not overlap with each other in each column in the two vertically adjacent text lines.

3. The image data generating device according to claim 2, wherein
    the text line spacing determining section decreases the spacing between the two vertically adjacent text lines as much as possible in the case of satisfying the non-overlapped condition.

4. The image data generating device according to claim 2, wherein
    the text line spacing determining section decreases the spacing between the two vertically adjacent text lines as much as possible in the case of satisfying the non-overlapped condition and a condition on a visual feature.

5. The image data generating device according to claim 1, wherein
    with respect to each column pair of the two vertically adjacent text lines, the text line spacing determining section determines which of preset patterns a combination fits, the combination being a combination of whether or not the content is present in a lower part of a column of the upper text line and whether or not the content is present in an upper part of a column of the lower text line,
    the text line spacing determining section determines whether to decrease the spacing between the two vertically adjacent text lines and how much the spacing is decreased in a case where the spacing is decrease, on the basis of a combination of the respective patterns that column pairs contained in the two vertically adjacent text lines fit.

6. The image data generating device according to claim 5, wherein
    the text line spacing determining section prepares, in advance, conditions that the combination of the patterns will satisfy and decreased amounts corresponding to the conditions, and
    the text line spacing determining section determines which of the conditions the combination of the patterns actually satisfies, and applies one of the decreased amounts which corresponds to the satisfied condition to the spacing between the two vertically adjacent text lines.

7. An image data generating method that generates image data, the image data comprising two or more text lines and a configuration including one or more columns contained in each text line,
    wherein presence or absence of a content in each of upper and lower rows of each column in each text line is dependent on a text line and a column,
    the image data generating method comprising a text line determining step determining whether or not the content is present in a lower row of each column contained in an upper text line of two vertically adjacent text lines and whether or not the content is present in an upper row of each column contained in a lower text line of the two vertically adjacent text lines,
    the text line spacing determining step determining, on the basis of the determination result, whether to decrease a spacing between the two vertically adjacent text lines and how much the spacing is decreased in a case where the spacing is decreased.

8. The image data generating method according to claim 7, wherein
    the text line spacing determining step determines whether to decrease the spacing between the two vertically adjacent text lines and how much the spacing is decreased in a case where the spacing is decreased, in the case of satisfying a non-overlapped condition that the content does not overlap with each other in each column in the two vertically adjacent text lines.

9. The image data generating method according to claim 8, wherein
    the text line spacing determining step decreases the spacing between the two vertically adjacent text lines as much as possible in the case of satisfying the non-overlapped condition.

10. The image data generating method according to claim 8, wherein
    the text line spacing determining step decreases the spacing between the two vertically adjacent text lines as much as possible in the case of satisfying the non-overlapped condition and a condition on a visual feature.

11. The image data generating method according to claim 7, wherein
    with respect to each column pair of the two vertically adjacent text lines, the text line spacing determining step determines which of preset patterns a combination fits, the combination being a combination of whether or not the content is present in a lower part of a column of the upper text line and whether or not the content is present in an upper part of a column of the lower text line,
    the text line spacing determining step determines whether to decrease the spacing between the two vertically adjacent text lines and how much the spacing is decreased in a case where the spacing is decrease, on the basis of a combination of the respective patterns that column pairs contained in the two vertically adjacent text lines fit.

12. The image data generating method according to claim 11, wherein the text line spacing determining step prepares, in advance, conditions that the combination of the patterns will satisfy and decreased amounts corresponding to the conditions, and the text line spacing determining step determines which of the conditions the combination of the patterns actually satisfies, and applies one of the decreased amounts which corresponds to the satisfied condition to the spacing between the two vertically adjacent text lines.

13. A non-transitory computer readable recording medium in which a computer program is stored, the computer program causing a computer to function as an image data generating device that generates image data, the image data comprising two or more text lines and a configuration including one or more columns contained in each text line, wherein presence or absence of a content in each of upper and lower rows of each column in each text line is dependent on a text line and a column, the image data generating program causing the computer to function as the image data generating device comprising a text line spacing determining section determining whether or not the content is present in a lower row of each column contained in an upper text line of two vertically adjacent text lines and whether or not the content is present in an upper row of each column contained in a lower text line of the two vertically adjacent text lines, the text line spacing determining section determining, on the basis of the determination result, whether to decrease a spacing between the two vertically adjacent text lines and how much the spacing is decreased in a case where the spacing is decreased.

14. The non-transitory computer-readable recording medium according to claim 13, wherein the text line spacing determining section determines whether to decrease the spacing between the two vertically adjacent text lines and how much the spacing is decreased in a case where the spacing is decreased, in the case of satisfying a non-overlapped condition that the content does not overlap with each other in each column in the two vertically adjacent text lines.

15. The non-transitory computer-readable recording medium image data generating program according to claim 14, wherein the text line spacing determining section decreases the spacing between the two vertically adjacent text lines as much as possible in the case of satisfying the non-overlapped condition.

16. The non-transitory computer-readable recording medium image data generating program according to claim 14, wherein the text line spacing determining section decreases the spacing between the two vertically adjacent text lines as much as possible in the case of satisfying the non-overlapped condition and a condition on a visual feature.

17. The non-transitory computer-readable recording medium image data generating program according to claim 13, wherein with respect to each column pair of the two vertically adjacent text lines, the text line spacing determining section determines which of preset patterns a combination fits, the combination being a combination of whether or not the content is present in a lower part of a column of the upper text line and whether or not the content is present in an upper part of a column of the lower text line, the text line spacing determining section determines whether to decrease the spacing between the two vertically adjacent text lines and how much the spacing is decreased in a case where the spacing is decrease, on the basis of a combination of the respective patterns that column pairs contained in the two vertically adjacent text lines fit.

18. The non-transitory computer-readable recording medium image data generating program according to claim 17, wherein the text line spacing determining section prepares, in advance, conditions that the combination of the patterns will satisfy and decreased amounts corresponding to the conditions, and the text line spacing determining section determines which of the conditions the combination of the patterns actually satisfies, and applies one of the decreased amounts which corresponds to the satisfied condition to the spacing between the two vertically adjacent text lines.

\* \* \* \* \*